US011812746B2

(12) United States Patent
Oren-Shamir et al.

(10) Patent No.: US 11,812,746 B2
(45) Date of Patent: Nov. 14, 2023

(54) METHOD OF CONTROLLING FUNGAL INFECTIONS IN PLANTS

(71) Applicant: THE STATE OF ISRAEL, MINISTRY OF AGRICULTURE & RURAL DEVELOPMENT, AGRICULTURAL RESEARCH ORGANIZATION (ARO) (VOLCANI CENTER), Rishon-LeZion (IL)

(72) Inventors: Michal Oren-Shamir, Rehovot (IL); Moran Oliva, Mazkeret Batia (IL); Efraim Lewinsohn, Timrat (IL); Noam Alkan, Moshav Kidron (IL); Yigal Elad, Ganei-Tikva (IL)

(73) Assignee: THE STATE OF ISRAEL, MINISTRY OF AGRICULTURE & RURAL DEVELOPMENT, AGRICULTURAL RESEARCH ORGANIZATION (ARO) (VOLCANI CENTER), Rishon-LeZion (IL)

( * ) Notice: Subject to any disclaimer, the term of this patent is extended or adjusted under 35 U.S.C. 154(b) by 35 days.

(21) Appl. No.: 16/329,305

(22) PCT Filed: Aug. 28, 2017

(86) PCT No.: PCT/IL2017/050958
§ 371 (c)(1),
(2) Date: Feb. 28, 2019

(87) PCT Pub. No.: WO2018/042425
PCT Pub. Date: Mar. 8, 2018

(65) Prior Publication Data
US 2019/0246639 A1 Aug. 15, 2019

Related U.S. Application Data

(60) Provisional application No. 62/380,440, filed on Aug. 28, 2016.

(51) Int. Cl.
*A01N 37/44* (2006.01)
*A01N 37/46* (2006.01)

(52) U.S. Cl.
CPC ............. *A01N 37/44* (2013.01); *A01N 37/46* (2013.01)

(58) Field of Classification Search
CPC .................... A01N 37/44; A01N 37/46
See application file for complete search history.

(56) References Cited

U.S. PATENT DOCUMENTS

| 4,521,408 | A | 6/1985 | Stapley |
| 5,604,203 | A | 2/1997 | Balasubramaniam |
| 6,734,166 | B1 | 5/2004 | Croom, Jr. et al. |
| 7,087,552 | B2 | 8/2006 | Blowers et al. |
| 7,135,449 | B2 | 11/2006 | Li et al. |
| 9,073,967 | B2 | 7/2015 | Cheng et al. |
| 2004/0141955 | A1 | 7/2004 | Stobel et al. |
| 2004/0185031 | A1 | 9/2004 | Strobel et al. |
| 2004/0266852 | A1* | 12/2004 | Coleman ................ A01N 37/02 514/400 |
| 2007/0155830 | A1 | 7/2007 | Liu et al. |
| 2007/0202141 | A1 | 8/2007 | Jumean et al. |
| 2009/0318505 | A1 | 12/2009 | Brandl et al. |
| 2010/0216636 | A1 | 8/2010 | Suty-Heinze et al. |
| 2010/0257636 | A1* | 10/2010 | Warpeha .................. A01H 3/04 800/287 |
| 2011/0287471 | A1 | 11/2011 | Stobel et al. |
| 2011/0302823 | A1 | 12/2011 | Bruck et al. |
| 2013/0005807 | A1 | 1/2013 | Ishida et al. |
| 2013/0137131 | A1 | 5/2013 | Stobel et al. |
| 2013/0224315 | A1 | 8/2013 | Green et al. |
| 2013/0252289 | A1 | 9/2013 | Stobel et al. |
| 2013/0252313 | A1 | 9/2013 | Stobel et al. |
| 2014/0086879 | A1 | 3/2014 | Strobel et al. |
| 2014/0107219 | A1 | 4/2014 | Watkins et al. |
| 2014/0271534 | A1 | 9/2014 | Wu et al. |
| 2014/0323572 | A1 | 10/2014 | Pimentel et al. |

FOREIGN PATENT DOCUMENTS

| CN | 1174656 A | 3/1998 |
| CN | 101142925 A | 3/2008 |
| CN | 101410016 A | 4/2009 |
| CN | 101677559 A | 3/2010 |
| CN | 101283685 B | 12/2010 |
| CN | 102258055 A | 11/2011 |
| CN | 103483081 A | 1/2014 |
| CN | 103918721 A | 7/2014 |

(Continued)

OTHER PUBLICATIONS

Schilder, A., Disease Control in Grapes Critical During and After Bloom, [online] Michigan State University; MSU Extension, 2009 [retrieved on Dec. 4, 2020]. Retrieved from the Internet :< https://www.canr.msu.edu/news/disease_control_in_grapes_critical_during_and_after_bloom1>, 6 pages. (Year: 2009).*
Ivey, M.L.L, 2015 Fungicide Spray Guide for Vegetables Produced in Louisiana, [online]. Plant Disease Facts by the Depart. of plant Path. & Crop Physio., LSU AgCenter, 2015 [retrieved on Dec. 4, 2020]. Retrieved from the Internet: https://www.lsu.edu/agriculture/plant/extension/hcpl-publications, 21 pp (Year: 2015).*
Daniel S. Egel, Vegetable Diseases, Tomato Disease Management in Greenhouses, Dec. 2015, Purdue extension publication (Year: 2015).*
O. Van Andel, "Fluorophenylalanine as a Systemic Fungicide", Nature, vol. 194, p. 790, 1962.
Islam, et al., "Biological Screening of a Novel Nickel (II) Tyrosine Complex", Micobiology, vol. 35, No. 1, p. 25-29, 2007.

(Continued)

Primary Examiner — Abigail Vanhorn
Assistant Examiner — Ali S Saeed
(74) Attorney, Agent, or Firm — The Roy Gross Law Firm, LLC; Roy Gross

(57) ABSTRACT

A method of controlling a fungus infection in a plant susceptible to *Botrytis* infection is provided. The method comprising applying to the plant an effective amount of a phenylalanine or an analog thereof for controlling said fungus infection in the plant.

11 Claims, 13 Drawing Sheets

(56) References Cited

FOREIGN PATENT DOCUMENTS

Figure 2C:
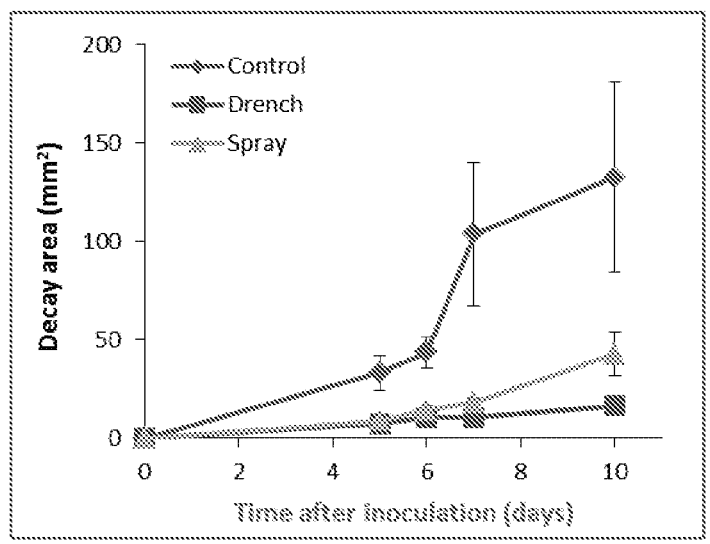

| | | |
|---|---|---|
| CN | 103931614 A | 7/2014 |
| EP | 2197899 B1 | 9/2014 |
| FR | 2405650 A1 | 5/1979 |
| JP | S62215503 A | 9/1987 |
| KR | 20070102677 A | 10/2007 |
| WO | 9620596 A1 | 7/1996 |
| WO | 9716969 A1 | 5/1997 |
| WO | 9719908 A1 | 6/1997 |
| WO | 02097061 A2 | 12/2002 |
| WO | 2006004433 A2 | 1/2006 |
| WO | 2010049405 A1 | 5/2010 |
| WO | 2010061502 A1 | 6/2010 |
| WO | 2012004795 A1 | 1/2012 |
| WO | 2014099984 A1 | 6/2014 |

OTHER PUBLICATIONS

Scalschi et al., "Silencing of OPR3 in tomato reveals the role of OPDA in callose deposition during the activation of defense responses against Botrytis cinerea", The Plant Journal (2015) 81, 304-315.
Camanes, G. et al., "An untargeted global metabolomic analysis reveals the biochemical changes underlying basal resistance and priming in Solanum lycopersicum, and identifies 1-methyltryptophan as a metabolite involved in plant responses to Botrytis cinerea and Pseudomonas sy". The Plant Journal, 84(1), 125-139, 2015.
Elad, Y. "The use of antioxidants (free radical scavengers) to control grey mould (*Botrytis cinerea*) and white mould (*Sclerotinia sclerotiomm*) in various crops". Plant Pathology, 41(4), 417-426, 1992.
Fillinger, S. et al., "Botrytis—the Fungus, the Pathogen and its Management in Agricultural Systems.", Jan. 2016.
Siegmund, U et al., "Reactive Oxygen Species in the Botrytis—Host Interaction. Botrytis—the Fungus, the Pathogen and Its Management in Agricultural Systems", 269-289, 2015.
Wang, H. et al., "Defence responses regulated by jasmonate and delayed senescence caused by ethylene receptor mutation contribute to the tolerance of petunia to Botrytis cinerea". Molecular Plant Pathology, 14(5), 453-469, Jun. 2013.
Patel et al., "Tomato Plants Overexpressing a Celery Mannitol Dehydrogenase (MTD) Have Decreased Susceptibility to Botrytis cinerea", American Journal of Plant Sciences, 6, 1116-1125, 2015.
Choquer, M. et al., "Botrytis cinereavirulence factors: new insights into a necrotrophic and polyphageous pathogen". FEMS Microbiology Letters, 277(1), 1-10, Dec. 2007.
Asselbergh, B. et al., "Resistance to Botrytis cinerea in sitiens, an Abscisic Acid-Deficient Tomato Mutant, Involves Timely Production of Hydrogen Peroxide and Cell Wall Modifications in the Epidermis". Plant Physiology, 144(4), 1863-1877, Aug. 2007.
Nakajima, M. et al., "Virulence factors of Botrytis cinerea". Journal of General Plant Pathology, 80(1), 15-23, Jan. 2014.
Pandey, P. et al., "Shared and unique responses of plants to multiple individual stresses and stress combinations: physiological and molecular mechanisms". Frontiers in Plant Science, vol. 6, pp. 1-14, Sep. 2015.
Ferrari, S. et al., "*Arabidopsis* local resistance to Botrytis cinerea involves salicylic acid and camalexin and requires EDS4 and PAD2, but not SID2, EDS5 or PAD4". The Plant Journal, 35(2), 193-205, Jul. 2003.
Tzin, V et al., "New Insights into the Shikimate and Aromatic Amino Acids Biosynthesis Pathways in Plants". Molecular Plant, 3(6), 956-972, Sep. 3, 2010.
Tzin, V. et al., "Expression of a bacterial feedback-insensitive 3-deoxy-d-arabino-heptulosonate 7-phosphate synthase of the shikimate pathway in *Arabidopsis elucidates* potential metabolic bottlenecks between primary and secondary metabolism". New Phytologist, 194(2), 430-439, Apr. 2012.
Oliva, M. et al., "Enhanced formation of aromatic amino acids increases fragrance without affecting flower longevity or pigmentation in Petunia x hybrida". Plant Biotechnology Journal, 13(1), 125-136, Oct. 4, 2014.

Pennycooke, J. et al. "Relationship of cold acclimation, total phenolic content and antioxidant capacity with chilling tolerance in petunia (Petunia x hybrida)", Environmental and Experimental Botany, vol. 53, No. 2, 225-232, Apr. 2005.
Alon, M. et al., "Activation of the Phenylpropanoid Pathway in Nicotiana tabacum Improves the Performance of the Whitefly Bemisia tabaci via Reduced Jasmonate Signaling". PloS ONE, 8(10), e76619, Oct. 25, 2013.
Kuc, J., "Phytoalexins, Stress Metabolism, and Disease Resistance in Plants". Annual Review of Phytopathology, 33 (1), 275-297, 1995.
Bais, H. et al., "Root specific elicitation and antimicrobial activity of rosmarinic acid in hairy root cultures of Ocimum basilicum". Plant Physiology and Biochemistry, 40(11), 983-995, Nov. 2002.
Petersen, M. et al., "Evolution of rosmarinic acid biosynthesis". Phytochemistry, 70(15-16), 1663-1679, 2009.
Shekarchi et al., "Comparative study of rosmarinic acid content in some plants of Labiatae family". Pharmacognosy Magazine, 8(29), 37, Jan. 2012.
Song, G. et al., "The folate precursor para-aminobenzoic acid elicits induced resistance against Cucumber mosaic virus and Xanthomonas axonopodis". Annals of Botany, 111(5), 925-934, May 2013.
Vogt, T., "Phenylpropanoid Biosynthesis". Molecular Plant, 3(1), 2-20, Jan. 2010.
Maeda, H. et al., "The Shikimate Pathway and Aromatic Amino Acid Biosynthesis in Plants". Annual Review of Plant Biology, 63(1), 73-105, 2012.
Tohge, T. et al., "Shikimate and Phenylalanine Biosynthesis in the Green Lineage". Frontiers in Plant Science, 4, Mar. 27, 2013.
Tzin, V. et al., "Tomato fruits expressing a bacterial feedback-insensitive 3-deoxy-d-arabino-heptulosonate 7-phosphate synthase of the shikimate pathway possess enhanced levels of multiple specialized metabolites and upgraded aroma". Journal of Experimental Botany, 64(14), 4441-4452, Nov. 2013.
Manela, N. et al., "Phenylalanine and tyrosine levels are rate-limiting factors in production of health promoting metabolites in Vitis vinifera cv. Gamay Red cell suspension". Frontiers in Plant Science, 6, Jul. 16, 2015.
Swartzberg, D. et al., "Botrytis cinerea induces senescence and is inhibited by autoregulated expression of the IPT gene". European Journal of Plant Pathology, 120(3), 289-297, Mar. 2008.
Aranega-Bou, P. et al., "Priming of plant resistance by natural compounds. Hexanoic acid as a model". Frontiers in Plant Science, 5, Oct. 2014.
Bahadur, A. et al., "Foliar application of I-phenylalanine and ferulic acids to pea plants: induced phenylalanine ammonia lyase activity and resistance against Erysiphe pisi". Archives of Phytopathology and Plant Protection, 45(4), 398-403, Feb. 2012.
Chen, Z. et al., "Biosynthesis of salicylic acid in plants". Plant Signaling & Behavior, 4(6), 493-496, Jun. 2009.
Dickman, M. et al., "Centrality of Host Cell Death in Plant-Microbe Interactions". Annual Review of Phytopathology, 51 (1), 543-570, 2013.
Grey, C. B. et al., "Systemic Application of L-Phenylalanine Increases Plant Resistance to Vertebrate Herbivory". Journal of Chemical Ecology, 23(5), 1463-1470, May 1997.
Hirata, H. et al., "Functional characterization of aromatic amino acid aminotransferase involved in 2-phenylethanol biosynthesis in isolated rose petal protoplasts". Journal of Plant Physiology, 169(5), 444-451, Mar. 15, 2012.
Lattanzio et al., "Role of phenolics in the resistance mechanisms of plants against fungal pathogens and insects". Phytochemistry: Advances in research 661, 23-67, Apr. 2006.
Nakabayashi, R. et al., "Enhancement of oxidative and drought tolerance in *Arabidopsis* by overaccumulation of antioxidant flavonoids". The Plant Journal, 77(3), 367-379, Feb. 2014.
Szarka, A. et al., "The Ascorbate-glutathione-α-tocopherol Triad in Abiotic Stress Response". International Journal of Molecular Sciences, 13(4), 4458-4483, 2012.
Tzin, V. et al., "The Biosynthetic Pathways for Shikimate and Aromatic Amino Acids in *Arabidopsis thaliana*". The *Arabidopsis* Book, 8, e0132, 2010.

(56) References Cited

OTHER PUBLICATIONS

Zhang, Y., et al., "Different ROS-Scavenging Properties of Flavonoids Determine Their Abilities to Extend Shelf Life of Tomato". Plant Physiology, pp. 00346.2015, 2015.
Gonda, I. et al., "Branched-chain and aromatic amino acid catabolism into aroma volatiles in *Cucumis melo* L. fruit". Journal of Experimental Botany, 61(4), 1111-1123, Feb. 2010.
Oros et al., "Antimicrobial activity of o-carboranylalanine", Amino Acids (1999) 17: 357-368.
International Search Report PCT/IL2017/050958 Completed Dec. 6, 2017; dated Dec. 10, 2017 6 pages.
Written Opinion of the International Search Report PCT/IL2017/050958 dated Dec. 10, 2017 5 pages.
Chandra, Abhishek et al., "Physicochemical and friccohesity study of glycine, I-alanine andl-phenylalaline with aqueous methyltrioctylammonium and cetylpyridinium chloride from T=(293.15 to 308.15) K", The Journal of Chemical Thermodynamics Academic Press London, GB, vol. 65, May 28, 2013 (May 28, 2013), pp. 18-28.
Costa et al., Study on the chemical composition variability of some processed bergamot (*Citrus bergamia*) essential bils, Flavour and Fragrance Journal 25, 4-12, 2010.
Kubo et al., Antimicrobial Activity of the Olive Oil Flavor Compounds, J. Agric. Food Chem. 43, 1629-1633, 1995.
Rahman et al., In vitro antibacterial properties of essential oil and organic extracts of Premna integrifolia Linn, Arabian Journal of Chemistry (2016) 9, S475-S479.
Hassan et al., An *Endophytic Nodulisporium* sp. from Central America Producing Volatile Organic Compounds with Both Biological and Fuel Potential, J. Microbiol. Biotechnol. (2013), 23(1), 29-35.
Sarkissian, C. N. et al., (1999). A different approach to treatment of phenylketonuria: Phenylalanine degradation with recombinant phenylalanine ammonia lyase. Proceedings of the National Academy of Sciences, 96(5), 2339-2344. doi:10.1073/pnas.96.5.2339.
Venkataraman et al., "Effect of the cellular constituents of the nitrogen-fixing blue-green alga, Cylindrospermum muscicola, on the root growth of rice plants" The Journal of General and Applied Microbiology, 13(1), 53-61, 1967.
Ibrahim et al., "Pathogenicity and control of Meloidogyne incognita on eggplant", Nematologia Mediterranea, 27(1), 31-33, 1999.
Prasongsuk, S., Ployngam, S., Wacharasindhu, S., Lotrakul, P., & Punnapayak, H. (2013). Effects of sugar and amino acid supplementation on Aureobasidium pullulans NRRL 58536 antifungal activity against four *Aspergillus* species. Applied Microbiology and Biotechnology, 97(17), 7821-7830. doi:10.1007/s00253-013-5069-5.

\* cited by examiner

FIG. 1A
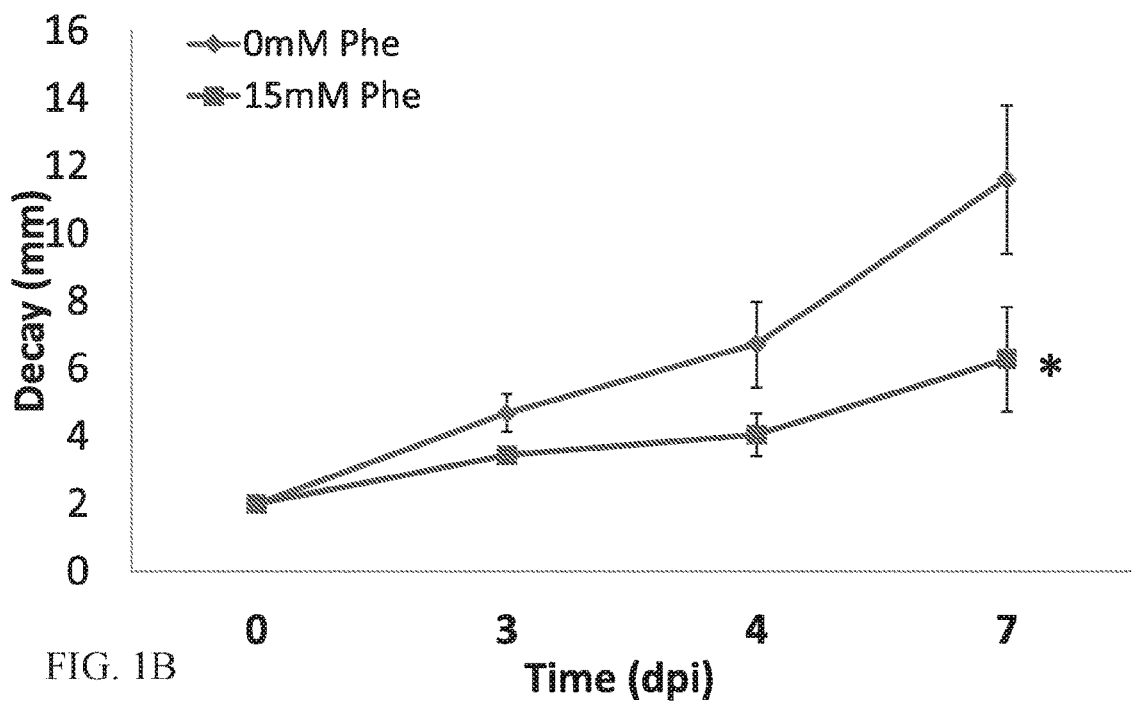
FIG. 1B
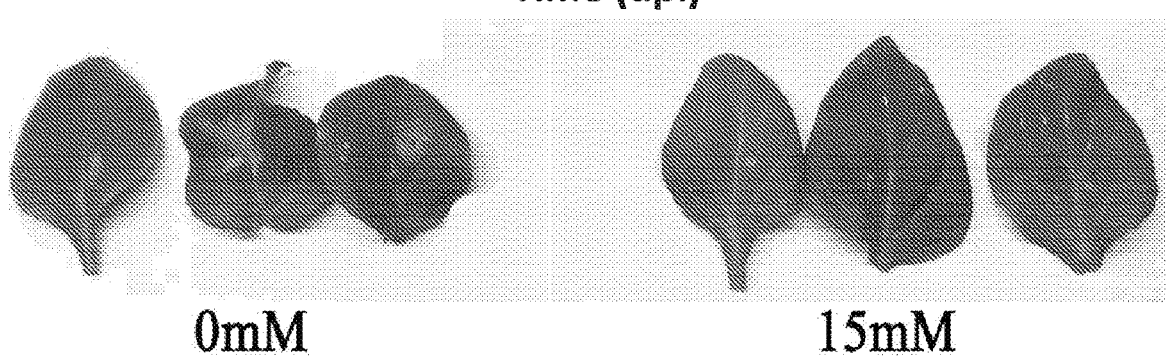
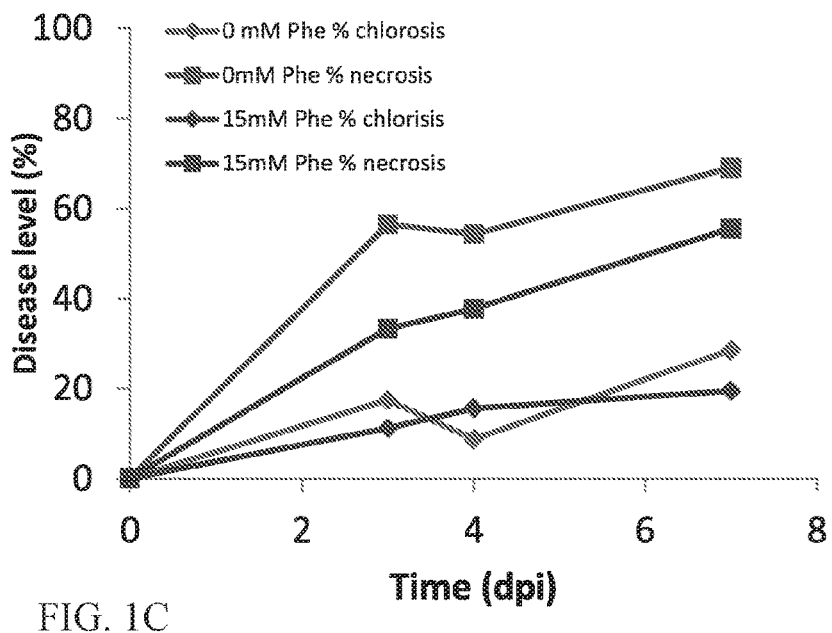
FIG. 1C

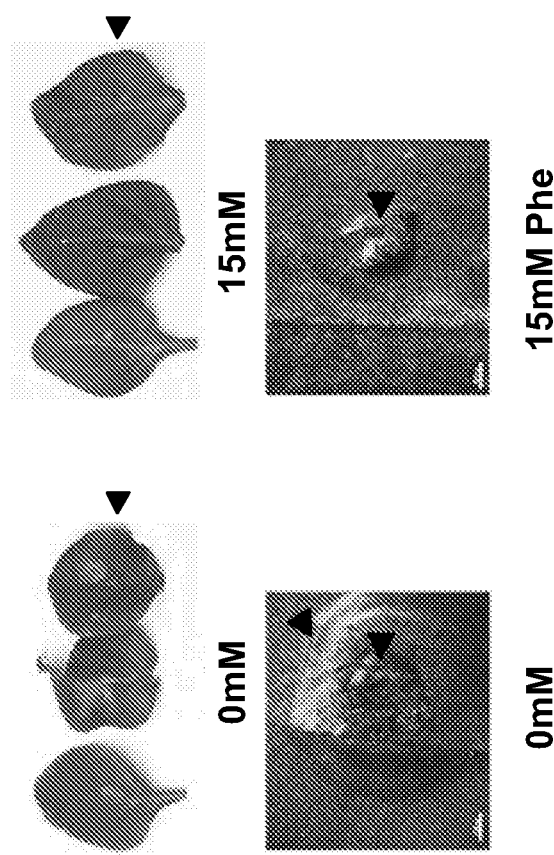
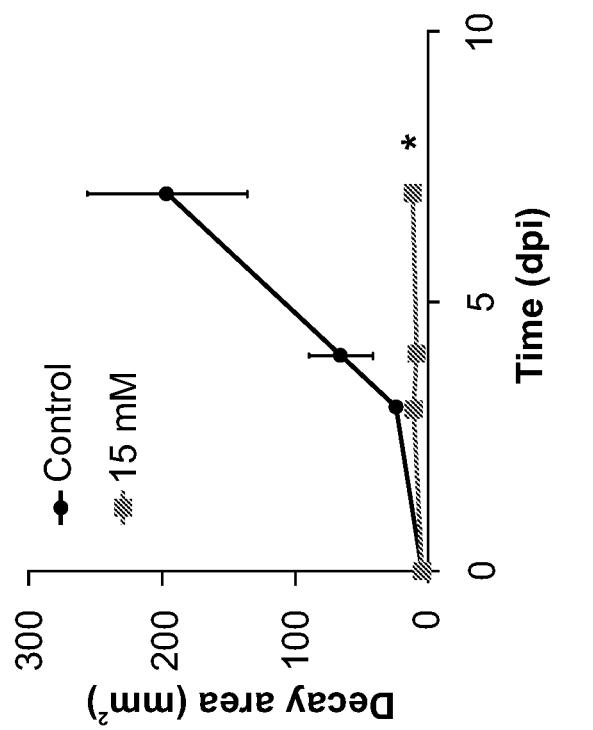
FIG. 1E
FIG. 1D

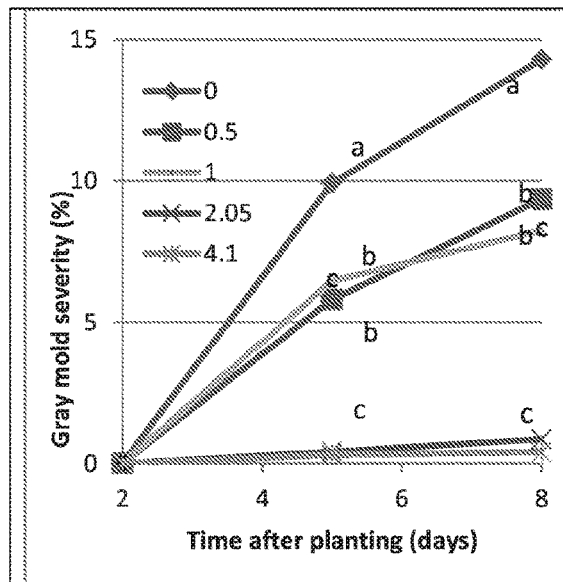
FIG. 2A - Phenylalanine drench
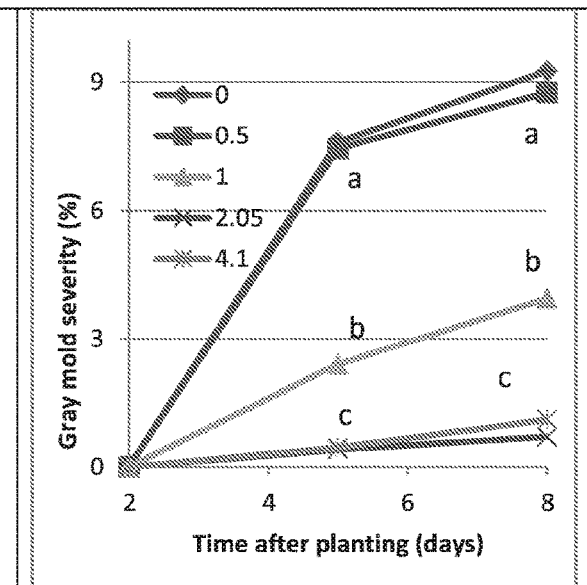
FIG. 2B - Phenylalanine spray
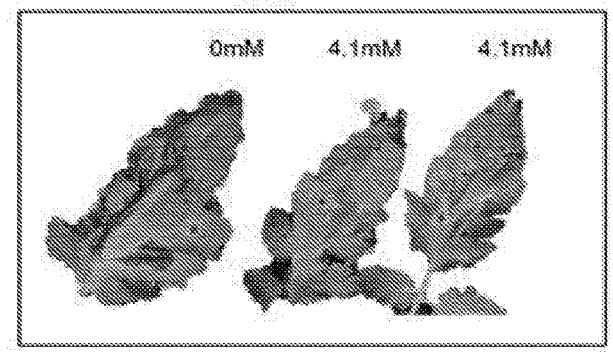

FIG. 4A
FIG. 4B
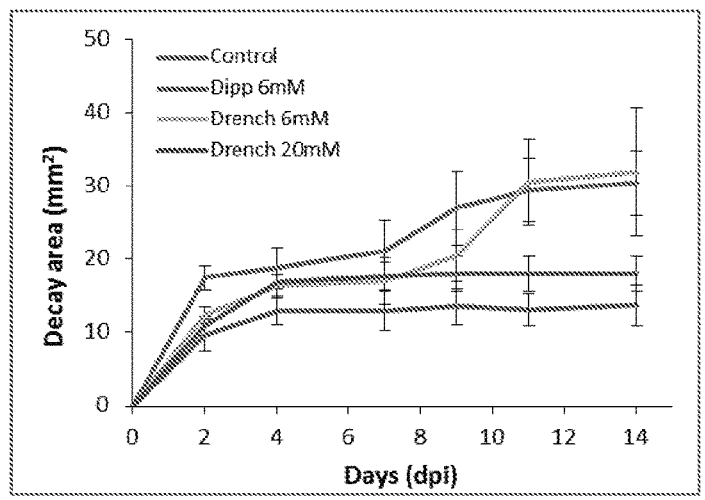
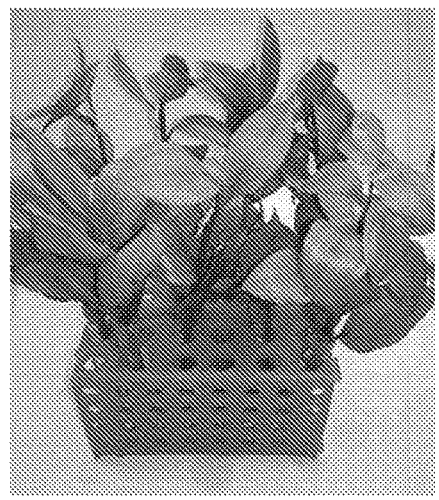

METHOD OF CONTROLLING FUNGAL INFECTIONS IN PLANTS

CROSS-REFERENCE TO RELATED APPLICATIONS

This application is a National Phase of PCT Patent Application No. PCT/IL2017/050958 having International filing date of Aug. 28, 2017, which claims the benefit of priority of U.S. Provisional Application No. 62/380,440 filed on Aug. 28, 2016. The contents of the above applications are all incorporated by reference as if fully set forth herein in their entirety.

FIELD AND BACKGROUND OF THE INVENTION

The present invention, in some embodiments thereof, relates to a method of controlling fungal infections in plants.

Plants interact with a broad range of microbial organisms throughout their life time, including pathogens. In order to support their health status and cope with pathogen challenges, plants produce a large array of chemical compounds (Scalschi et al., 2015). *Botrytis* spp. including *B. cinerea* are necrotrophic pathogens, causing rot on above-ground organs, with a wide host range of more than 1400 plant species, including many members of the Solanaceae family (Elad et al., 2016). The Solanaceae members susceptible to *Botrytis* include important crops such as *Solanum lycopersicum* and *Solanum tuberosum* (Fillinger and Elad, 2016). *Petunia hybrida*, a Solanaceae model plant for metabolomics and fragrance studies, is susceptible to *B. cinerea* (Wang et al., 2013; Elad et al., 2016).

*Botrytis cinerea* causes huge losses in crops during growth and storage of fruits, vegetables and cut flowers (Patel et al., 2015; Fillinger and Elad, 2016). The broad host range of *B. cinerea* is due to the wide range of virulence factors, including lytic enzymes and toxins (Choquer et al., 2007), as well as factors which reduce host defense and alter levels of reactive oxygen species (ROS) (Asselbergh et al., 2007; Nakajima and Akutsu, 2014; Patel et al., 2015).

Plants use a wide range of defense mechanisms to avoid infection by pathogens. These include local induced defense response, formation of local lesions with increased production of ROS, formation of antimicrobial phenolic compounds, deposition of callose and lignin, and induction of pathogenesis related (PR) protein synthesis (Lattanzio et al., 2006). Enhancement in phenol phytoalexins and other aromatic antioxidant compounds following biotic stress is the result of the induction of the shikimate pathway synthesizing aromatic amino acids (AAAs) and of downstream specific polyphenol pathways (Pandey et al., 2015; Camañes et al., 2015).

Additional background art includes:
U.S. Pat. No. 7,087,552
WO2012004795
ICS, Ferrari et al., Plant J. 2003 July; 35(2):193-205)
Tzin and Galili, 2010
Tzin et al., 2012a; Oliva et al., 2015
Pennycooke et al., 2005; Alon et al., 2013
Kuc, 1995;
Bais et al., 2002;
Petersen et al., 2009;
Shekarchi et al., 2012;
Song et al., 2013
Vogt, 2010; Maeda and Dudareva, 2012; Tohge et al., 2013;
Tzin et al., 2013; Tzin et al., Manela et al., 201

SUMMARY OF THE INVENTION

According to an aspect of some embodiments of the present invention there is provided a method of controlling a fungus infection in a plant susceptible thereto, the method comprising applying to the plant an effective amount of a phenylalanine or an analog thereof for controlling the fungus infection in the plant.

According to an aspect of some embodiments of the present invention there is provided a method of controlling a *Botrytis* infection in a plant susceptible to *Botrytis* infection, the method comprising applying to the plant an effective amount of a phenylalanine or an analog thereof for controlling the *Botrytis* infection in the plant.

According to some embodiments of the invention, the fungus is selected from the division Ascomycota and Oomycota.

According to some embodiments of the invention, the fungus is from the division Ascomycota.

According to some embodiments of the invention, the fungus is selected from the group consisting of *Botrytis, Plenodomus tracheiphilus* syn *Phoma tracheiphila, Sclerotinia sclerotiorum* and *Alternaria*.

According to some embodiments of the invention, the fungus is from the division Oomycota.

According to some embodiments of the invention, the fungus is *Pythium aphanidermatum*.

According to some embodiments of the invention, the *Botrytis* is selected from a *Botrytis* species selected from the group consisting of *B. cinerea, B. fabae, B. aclada* and *B. pseudocinerea*.

According to some embodiments of the invention, the applying comprises pre-harvest applying.

According to some embodiments of the invention, the applying comprises post-harvest applying.

According to some embodiments of the invention, the applying comprises pre-harvest applying and not post-harvest applying.

According to some embodiments of the invention, the applying comprises post-harvest applying and not pre-harvest applying.

According to some embodiments of the invention, the plant is at a post-blossom stage.

According to some embodiments of the invention, the plant is at a blossom stage.

According to some embodiments of the invention, the plant is at a pre-blossom stage.

According to some embodiments of the invention, the plant is not an ornamental plant.

According to some embodiments of the invention, the plant comprises fruit.

According to some embodiments of the invention, the phenylalanine or the analog is formulated in a composition selected from the group consisting of a dip, a spray or a concentrate.

According to some embodiments of the invention, the formulated comprises a surfactant.

According to some embodiments of the invention, the applying is in the vicinity of or onto the roots, stems, trunk, seed, fruits or leaves of the plant.

According to some embodiments of the invention, the applying is by irrigation, drenching, dipping, soaking, injection, coating or spraying.

According to some embodiments of the invention, the plant is selected from the group consisting of *petunia*, tomato, sweet basil, cucumber, avocado and lemon.

According to some embodiments of the invention, the plant susceptible to fungus or *Botrytis* infection is a cultivated fruit plant.

According to some embodiments of the invention, the cultivated fruit plant is selected from the group consisting of strawberries, grapes, apples, blueberries, cherries.

According to some embodiments of the invention, the plant susceptible to *Botrytis* infection is selected from the group consisting of bean, cabbage, carrot, onion and cucumber.

According to some embodiments of the invention, the applying is in an open field.

According to some embodiments of the invention, the applying is in a greenhouse.

According to some embodiments of the invention, the applying is in a storage facility.

According to some embodiments of the invention, the applying comprises repeated application.

According to some embodiments of the invention, the repeated application comprises weekly administration during blossom pre-harvest.

According to some embodiments of the invention, the applying is post emergence.

According to some embodiments of the invention, the method further comprises analyzing presence or absence of the fungus infection or severity.

According to some embodiments of the invention, a concentration of the phenylalanine or the analog is at a range of 0.01-50 mM.

According to some embodiments of the invention, the analog comprises tyrosine.

According to an aspect of some embodiments of the present invention there is provided an agricultural composition comprising phenylalanine or an analog thereof and a surfactant for controlling a fungus infection in a plant.

According to an aspect of some embodiments of the present invention there is provided an agricultural composition comprising phenylalanine and tyrosine for controlling a fungus infection in a plant.

According to some embodiments of the invention, the composition further comprises a surfactant.

According to some embodiments of the invention, the surfactant is a cationic surfactant.

According to some embodiments of the invention, the surfactant is an anionic surfactant.

According to some embodiments of the invention, the surfactant is a non-ionic surfactant.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 1A-E display *petunia* leaves treated with Phe showing higher resistance to *B. cinerea*. Detached leaves were wound inoculated by *B. cinerea* conidia. FIG. 1A-) Decay diameter of *petunia* detached leaves (n=25) either treated with 15 mM Phe or not treated with Phe was measured until 7 dpi. FIG. 1B—Leaves of non-treated and treated with 15 mM Phe at 4 days post inoculation (dpi). FIG. 1C—Percentage of treated and non-treated leaves that developed either necrosis or chlorosis along disease development following artificial wound inoculation with *B. cinerea* (n=45). The experiment was repeated and the results are shown in FIGS. 1D-E, with the commercial *petunia* plants ('Dream Heaven') whereby necrotic area was measured at 3, 4, and 7 days post inoculation (dpi) Averages±SE results are presented for 25 leaves, as decay area in $mm^2$. Asterisks (*) represent statistically significant differences between the transgenic lines and control, using t-tests, $P\leq0.05$ (FIG. 1D). Photographs of leaves with and without Phe treatment at day 4 from inoculation (FIG. 1E upper panel), and bright field imaging of inoculated area 11 dpi (FIG. 1E, lower panel).

FIGS. 2A-B show the effect of 0.5-4.1 mM of phenylalanine applied by drenching (FIG. 2A) or spraying (FIG. 2B also showing an image of detached leaves) on the severity of gray mold (*B. cinerea*) in tomato, 0-8 days post infection. Disease severity is presented as percent. 0=control. Results were statistically analyzed according to Fisher's protected LSD test. Values at each evaluation date followed by a common letter are significantly not different ($P\leq0.05$).

Figure 2D:

FIGS. 2C-D show the effect of treatment of whole *petunia* plants ('Dream Heaven') either by spraying the plants (with the addition of 0.1% Silwett L-77 surfactant) or drenching the pots with 6 mM exogenous phenylalanine (Phe) on tolerance to *B. cinerea*, as manifested by decay area ($mm^2$) results are presented as average±SE.

Figure 3A:
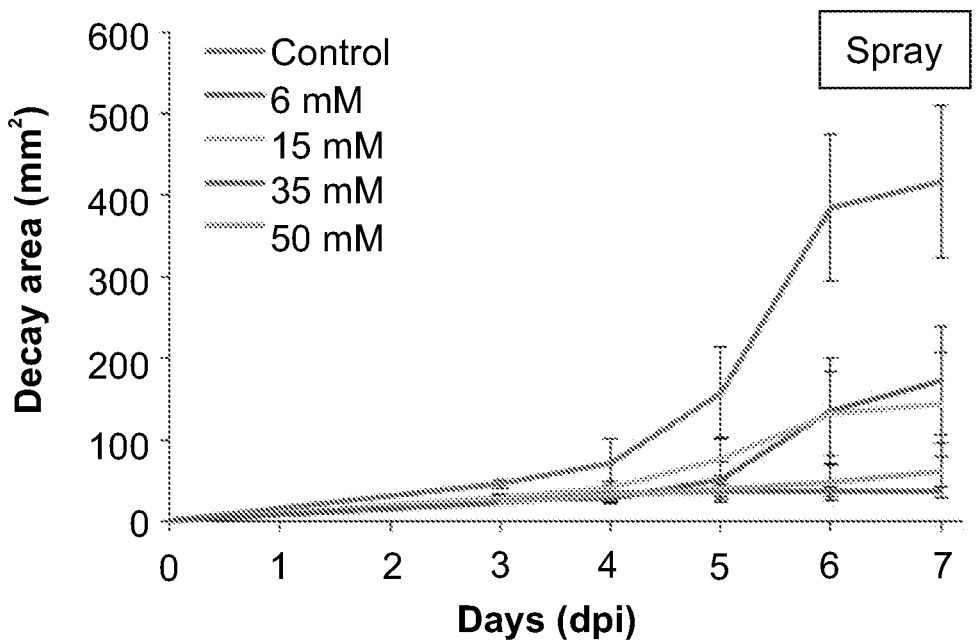
Figure 3B:
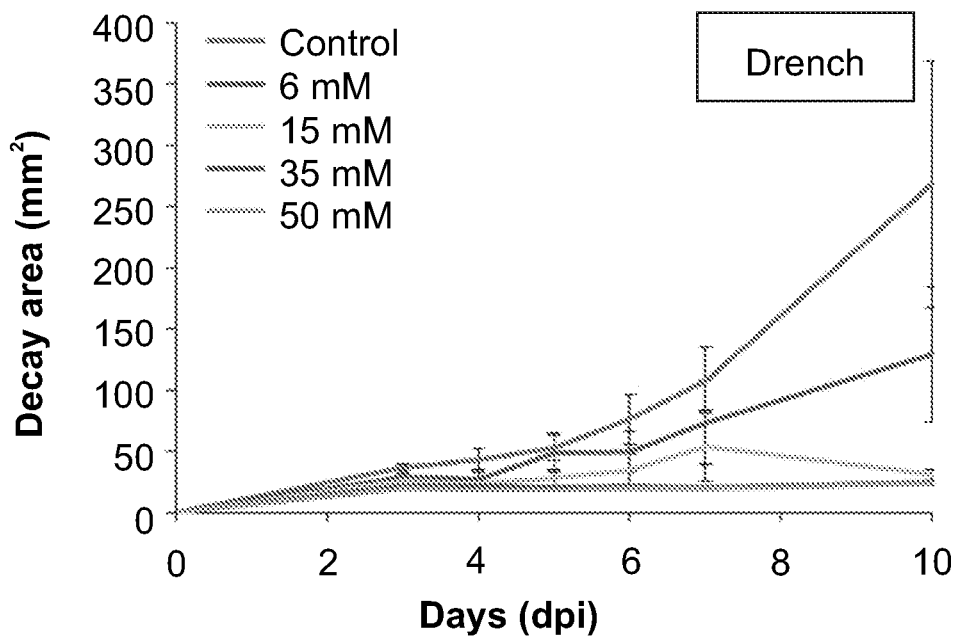

FIGS. 3A-B show that higher Phe concentrations increase the tolerance of *petunia* plants to *B. cinerea* by spraying the plants (with the addition of 0.1% Silwett L-77 surfactant) or drenching the pots. Phe concentrations used are 6-50 mM. Decay area ($mm^2$) results are presented as average±SE.

Figure 3C:
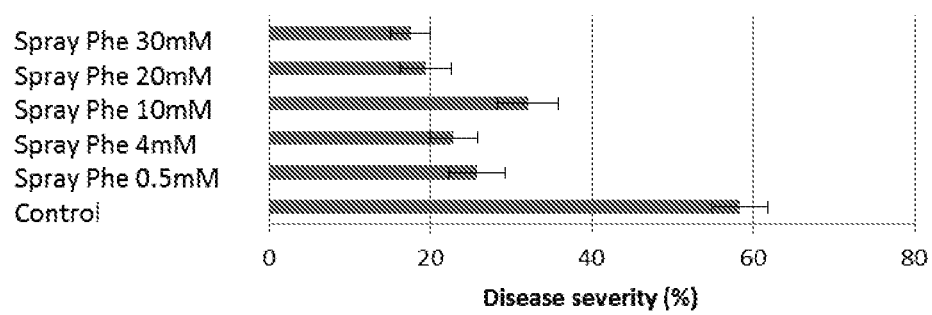
Figure 3D:
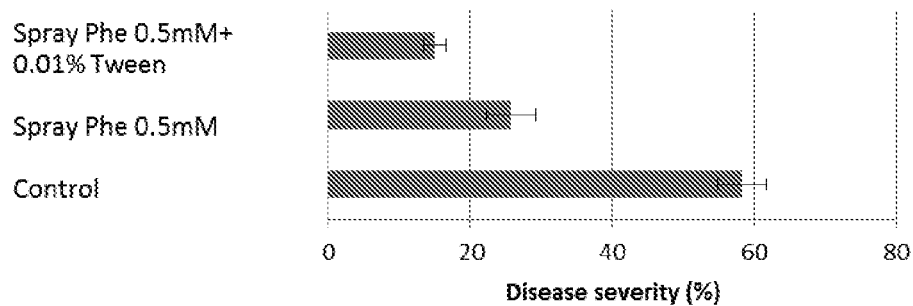

FIGS. 3C-D show that higher Phe concentrations increase the tolerance of tomato plants to *B. cinerea* by spraying the plants (without surfactant). Phe concentrations used are 0.5-30 mM Phe. (FIG. 3C). Results are presented by disease severity scoring 11 days after infection with conidia of *B. cinerea*, where 0=no disease and 100=total coverage by gray mold rot. FIG. 3D presents the effect of Phe without and with a surfactant where Phe was applied at a rate of 0.5 mM. The addition of the surfactant resulted in a significant improvement of disease control (FIG. 3D) Results are presented by disease severity scoring 11 days after infection with conidia of *B. cinerea*, where 0=no disease and 100=total coverage by gray mold rot. The bars represent the SE.

FIGS. 4A-B show that treatment of *Ruscus* branches treated with exogenous phenylalanine after they have been cut (FIG. 4B) lead to increased tolerance to *B. cinerea* (FIG. 4A). Phe concentrations used are 0.5-30 mM. Decay area ($mm^2$) results are presented as average±SE.

Figure 5B:
Figure 5A:
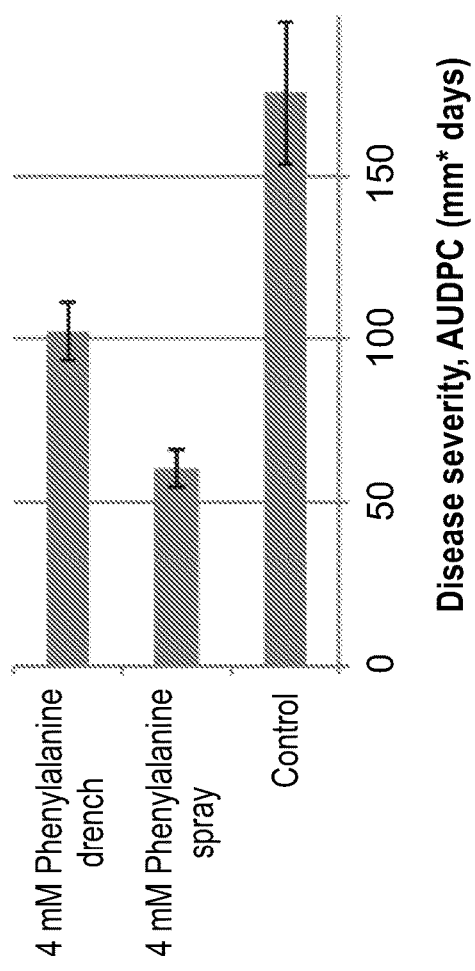

FIGS. 5A-B show that Phe increases the tolerance of sweet basil plants to white rot (*Sclerotinia sclerotiorum*) by spraying the plants or drenching the pots (FIG. 5A). Phe concentration used was 4.1 mM. Results are presented by disease severity scoring of AUDPC (area under disease progress curve during 6 days after infection) where the severity is marked by units of rot diameter (mm) multiplied by the time of incubation.

Figure 6B:
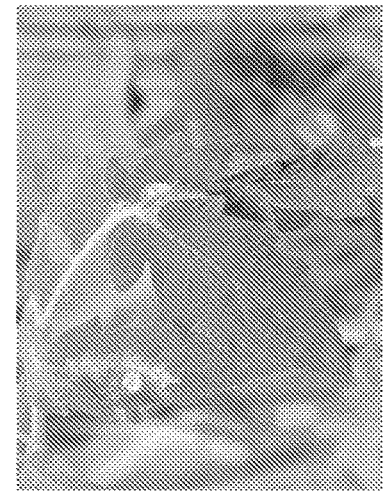
Figure 6A:
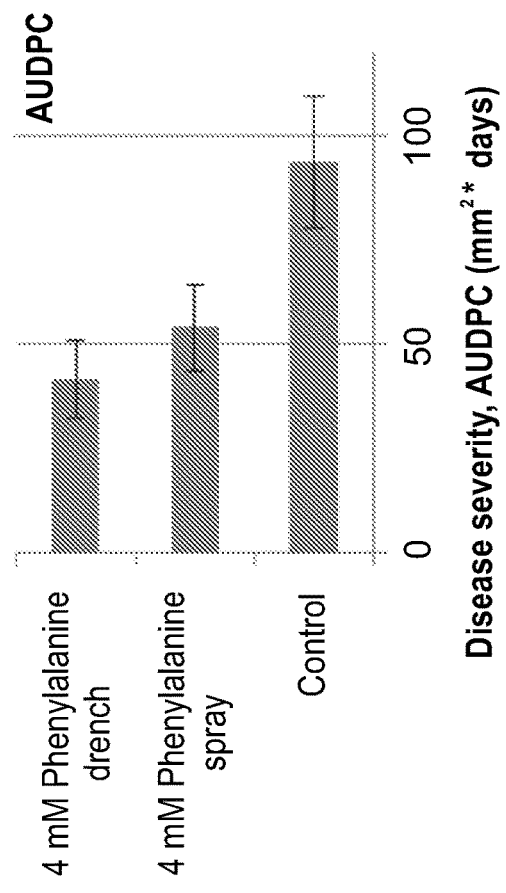

FIGS. 6A-B show that treatment of tomato either by drenching or spraying with phenylalanine leads to increased tolerance to White rot (*Sclerotinia sclerotiorum*). Phe concentration used was 4 mM. Results are presented by disease severity scoring of AUDPC (area under disease progress curve during 15 days after infection) where the severity is marked by units of rot area ($mm^2$) multiplied by the time of incubation.

Figure 7A:
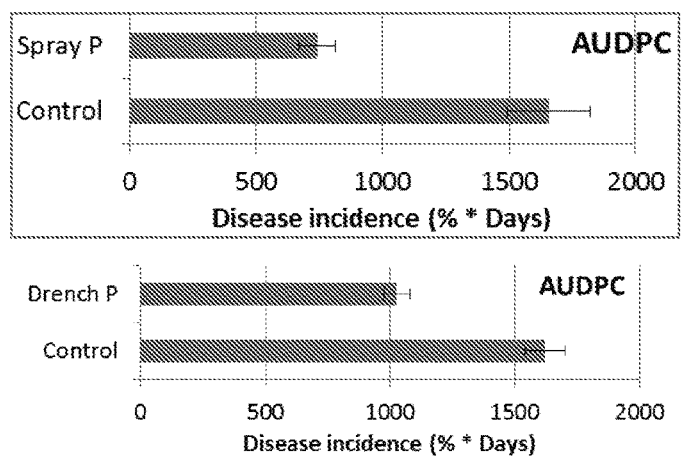
Figure 7B:
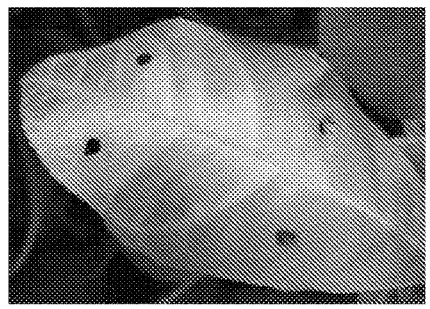

FIGS. 7A-B show that treatment of lemon either by drenching or spraying with phenylalanine leads to increased tolerance to Mal secco disease, caused by the *Plenodomus tracheiphilus* syn *Phoma tracheiphila* fungus. Phe concentration used was 4 mM. Results are presented by disease incidence of infection sites as percent resulting from drench treatment (lower FIG. 7A) and spray treatment (upper FIG. 7A)

Figure 8:
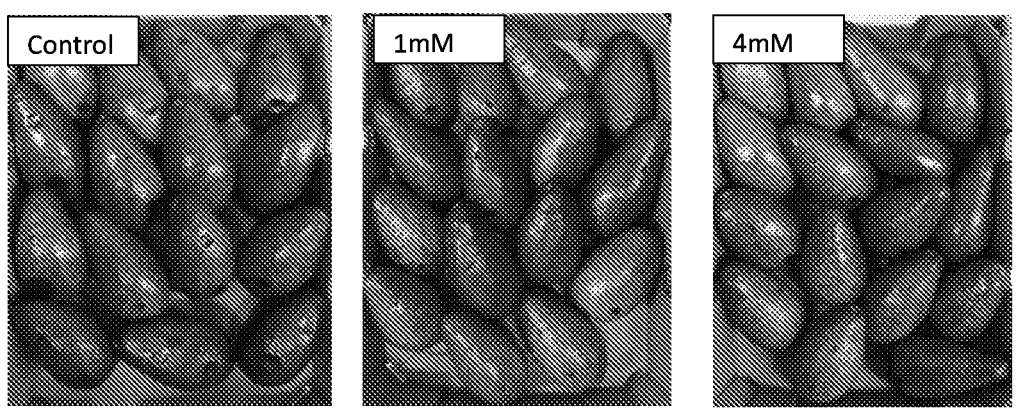

FIG. 8 are images of avocado fruits of the cultivar 'Ettinger' dipped in water or 1 mM or 4 mM phenylalanine for 30 seconds and stored for one day at 5° C. Then the avocado fruit were inoculated by wounding at the fruit equatorial with 7p of spore suspension of *Alternaria alternata* at the concentration of $10^5$ conidia/ml at two sides of the fruit. The fruits were stored at 23° C. The decay area was monitored during 6 days post inoculation. Clearly, the fruit treated with Phe solutions, postharvest show increased tolerance to *Alternaria alternata*.

Figure 9A:
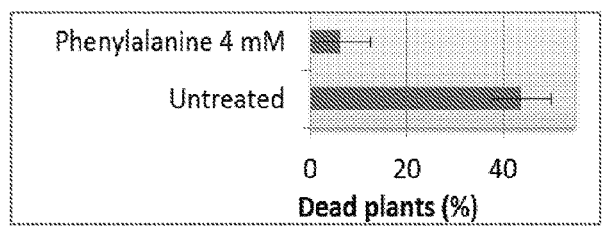
Figure 9B:
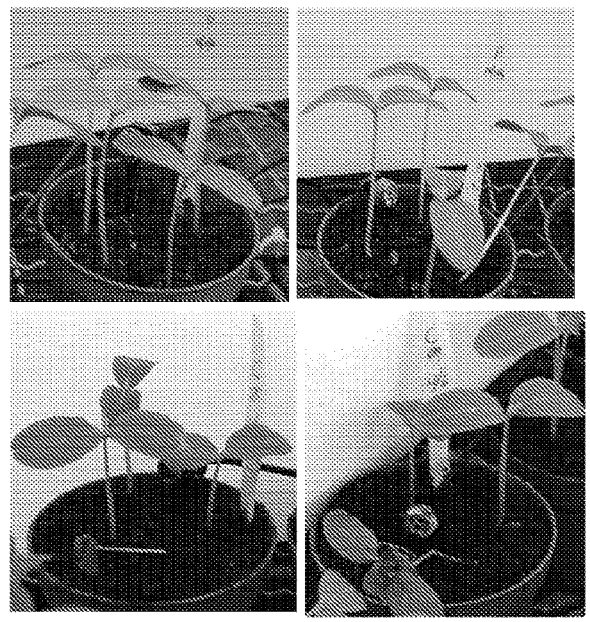

FIGS. 9A-B show that treatment of cucumber plants with phenylalanine leads to increased tolerance to *Pythium aphanidermatum*. Phe concentration used was 4 mM. Results are presented by the percentage of dead plants incidence (FIG. 9A). FIG. 9B: control treatment=lower row and Phe treatment=upper row.

Figure 10A:
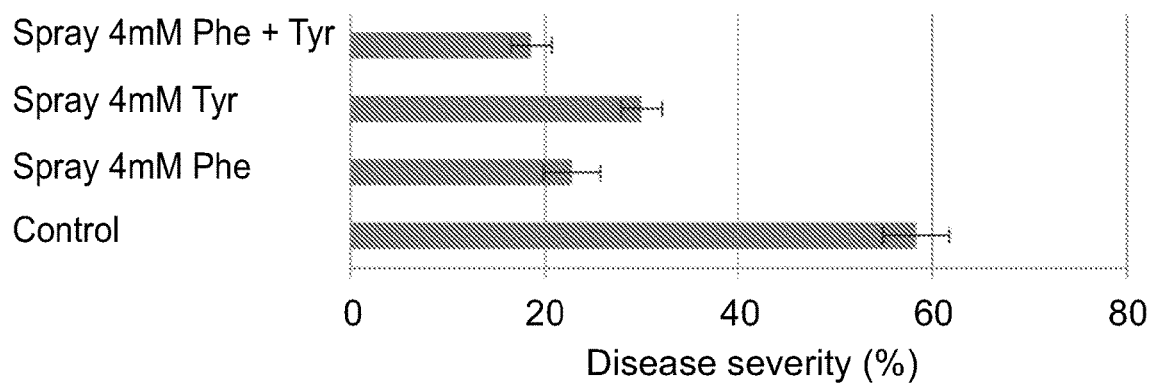
Figure 10B:
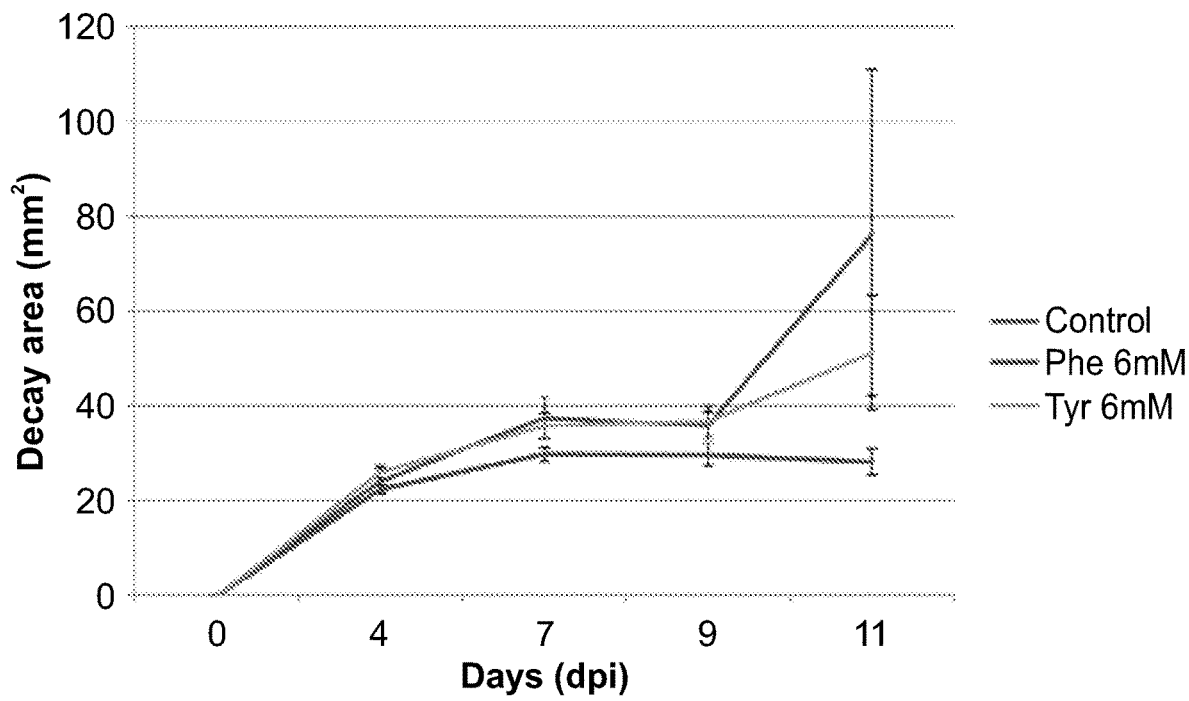

FIGS. 10A-B shows that treatment of tomato (FIG. 10A) and *petunia* (FIG. 10B) plants with Phe, Tyrosine (Tyr) or a combination of same leads to increased tolerance to *B. cinerea*, as determined by disease severity scoring (FIG. 10A) or decay area as average±SE (FIG. 10B).

Figure 11A:
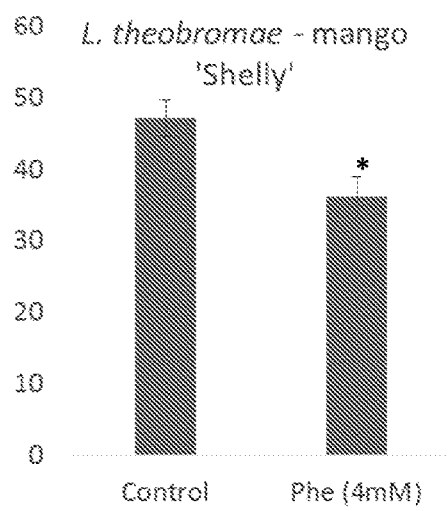
Figure 11B:

FIGS. 11A-B show Mango fruits of the cultivar 'Shelly' that were dipped in water or 4 mM phenylalanine for 30 seconds and stored for one day at 12° C. Then the mango fruits were inoculated at the fruit stem-end with 20 µl of spore suspension of *Lasiodiplodia theobromae* at the concentration of 105 conidia/ml at two sides of the fruit. The decay area was monitored after 6 days post inoculation, while incubation at 23° C.

DESCRIPTION OF SPECIFIC EMBODIMENTS OF THE INVENTION

The present invention, in some embodiments thereof, relates to a method of controlling *Botrytis* infection.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

*Botrytis cinerea* is a necrotrophic pathogenic fungus with an exceptionally wide host range comprising at least 1400 possible hosts (Elad et al., 2016). Because of its wide host range and because *B. cinerea* is a major player in economical plant crop losses in many commercially grown crops. Amongst growers, the fungus is commonly referred to as *Botrytis*.

*Botrytis* actively kills infected cells, causing soft rot, blights, leaf spot, damping-off and stem cancers. Affected leaves become covered with conidiophores and conidia, and subsequently collapse and wither. The fungus will grow from diseased leaves into the stem and produce dry, light brown lesions a few millimeters to several centimeters in length. Lesions may also form at pruning scars on the stem. The stem lesions may also be covered with a gray mold. In severe cases, the infection girdles the stem and kills the plant. Older, senescent tissues are usually more susceptible to attack by *Botrytis* than younger tissues.

In order to prevent the development of *Botrytis* in greenhouse grown plants, the temperature and relative humidity must be closely regulated. It is further important to provide water without wetting the leaves. For field grown plants, good drainage and weed control should be employed. Moreover, the nutrient levels of the plants must be kept high. However, these preventive measures cannot fully avert the occurrence of considerable yield loss in case of infection.

Fungicides are available for controlling *Botrytis* in both greenhouse and field grown plants (e.g., tomato). However, *Botrytis* is known to have developed resistance against several commonly used fungicides. In addition, the use of fungicides is undesired both from an economic and from an environmental perspective.

Whilst reducing the present invention to practice, the present inventors have studied the effect of the increased accumulation of Phe derived specialized metabolites in *petunia* and *Arabidopsis* leaves on their resistance to *Botrytis*. Direct application of Phe reduced *Botrytis* rots in affected plants. Further the present inventors were able to decrease disease symptoms in tomato plant infected with *Botrytis* treated with Phe by either drenching or spraying.

The results in these three unrelated plant species, points to the use of phenylalanine or analogs thereof in controlling *Botrytis* infection.

Whilst further reducing embodiments of the invention to practice, the present inventors were able to show that the effect of Phe treatment is robust and affects fungi from a number of orders when applied on different plants (e.g., *petunia*, tomato, sweet basil, cucumber, avocado and lemon).

As shown in Examples 1-11 below, Phe treatment controls 4 fungi from the Ascomycota division (*Botrytis cinerae*, *Plenodomus tracheiphilus* syn *Phoma tracheiphila*, *Sclerotinia sclerotiorum* and *Alternaria*), and *Pythium aphanidermatum* from the Oomycota division. Effective Phe treatment can be done in numerous ways including, but not limited to, spraying of whole plants, drenching of the soil in which the plants are growing, dipping of whole cut branches, drenching of cut branches and dipping of postharvest fruit.

While further reducing embodiments of the invention to practice, the present inventors were able to show that aromatic analogs of Phe such as Tyrosine share the antifungal properties of Phe (see Example 11), thereby enabling the use of Phe analogs in controlling fungal infections in plants.

According to an aspect of the invention there is provided a method of controlling a fungus infection in a plant susceptible thereto, the method comprising applying to the plant an effective amount of a phenylalanine or an analog thereof for controlling said fungus infection in the plant.

According to an aspect of the invention there is provided a method of controlling a *Botrytis* infection in a plant susceptible to *Botrytis* infection, the method comprising applying to the plant an effective amount of a phenylalanine or an analog thereof for controlling said *Botrytis* infection in the plant.

As used herein the term "controlling" refers to preventing or reducing fungal infection or inhibiting the rate and extent of such infection. Curative treatment is also contemplated.

According to a specific embodiment, the controlling is prevention of *Botrytis* infection.

As used herein "fungus" refers to a plant fungal pathogen.

According to a specific embodiment the fungus belongs to the Ascomycetes or the Basidiomycetes.

Examples of Ascomycetes include but are not limited to:
*Fusarium* spp. (*Fusarium* wilt disease)
*Thielaviopsis* spp. (canker rot, black root rot, *Thielaviopsis* root rot)
*Verticillium* spp.
*Magnaporthe grisea* (rice blast)
*Sclerotinia sclerotiorum* (cottony rot)

Examples of Basidiomycetes include, but are not limited to
*Ustilago* spp. (smuts)
*Rhizoctonia* spp.
*Phakospora pachyrhizi* (soybean rust)
*Puccinia* spp. (severe rusts of cereals and grasses)
*Armillaria* spp. (honey fungus species, virulent pathogens of trees According to a specific embodiment, the fungus belongs to the Oomycetes division, also referred to as "fungus-like organisms". They include some of the most destructive plant pathogens including the genus *Phytophthora*, which includes the causal agents of potato late blight[3] and sudden oak death. Particular species of oomycetes are responsible for root rot.

According to a specific embodiment the oomycete plant pathogens include:
*Pythium* spp.
*Phytophthora* spp.

Following are further examples of fungi that are contemplated targets for control according to some embodiments of the invention.

TABLE 1

| Fungus | Name of plant disease | Important sensitive crops |
| --- | --- | --- |
| *Botrytis cinerea* | Gray Mold | Grape, strawberry, tomato, cucurbits, lettuce, eggplant, pepper, bean, chickpea, pea, rose, petunia, gerbera, pelargonium, ruscus, pear, peach, plum, pomegranate, various berries, eucalyptus, sweet basil |
| *Sclerotinia sclerotiorum* | White mold | Bean, cucumber, tomato, lettuce, peanut, carrot, pea, clover, potato, eggplant, rapeseed, faba bean, pepper, artichoke, banana, sweet basil |
| *Blumeria graminis* | powdery mildew | Wheat and barley |
| Various pathogens | Powdery mildews | Grape, strawberry, tomato, cucurbits, eggplant, pepper, bean, pea, rose, gerbera, almond, pear, peach, plum, various berries, carrot, mango, apple |
| Various pathogens | Downy mildews | Grape, cucurbits, lettuce, onion, chickpea, rose, gerbera, clover, sunflower, barley, sorghum, pear, peach, plum, pomegranate, basil, spinach |
| *Phytophthora infestans* | Late blight | Potato, tomato, eggplant |
| *Alternaria solani* | Early blight | Potato, tomato |
| *Puccinia* spp. | Wheat rusts | Wheat |
| *Phakopsora pachyrhizi* | Asian soybean rust | Soybean |
| Various pathogens | Rusts | Alfalfa, pea, bean, faba bean, rose, barley, sunflower, chickpea, sorghum, maize, carrot, onion, beet, apricot, peach, plum, almond, fig, pine, pelargonium, carnation |
| *Hemileia vastatrix* | Coffee rust | Coffee |
| *Fusarium oxysporum* (various formae speciales) | Fusarium wilts | Banana (f.sp. *cubense*), tomato (f.sp. *lycopersici*), melon (f.sp. *melonis*), other cucurbits, sweet potato, pea, chick pea, cotton, onion, eggplant, celery, pepper, garlic, carnation |
| *Pythium* spp. | Pythium damping off, basal rot, root rot | Various crops |
| *Rhizoctonia solani* | Rhizoctonia damping off, basal rot, root rot | Various crops |
| *Cercospora* spp. | Leaf spot | Peanut, alfalfa, pea, clover, carrot, cucurbits, lettuce, beets, celery, bean, strawberry, banana, olive, rose, pelargonium |
| *Alternaria alternata* | Leaf spots, fruit spots, rots | Pea, sunflower, tomato, potato, chick pea, onion, cucurbits, lettuce, eggplant, pepper, pear, avocado, persimmon, citrus, almond, pomegranate |

TABLE 1-continued

| Fungus | Name of plant disease | Important sensitive crops |
|---|---|---|
| *Phytophthora cinnamomi* | Phytophthora root rot | Avocado, pomegranate, proteas |
| *Verticillium dahliae* | Verticillium wilt | Peanut, alfalfa, olive, tomato, potato, cotton, clover, potato, eggplant, pepper, strawberry, avocado, cherry, mango, gerbera, rose |
| *Magnaporthe oryzae* | Rice blast | Rice |
| *Fusarium graminearum* | Head blight | Cereal species |
| *Mycosphaerella graminicola* | Septoria tritici blotch | Wheat |
| *Colletotrichum* spp. | Anthracnose | Alfalfa, pea, strawberry, chickpea, clover, onion, eggplant, tomato, pepper, bean, avocado, persimmon, peach, banana, citrus species, olive, mango, almond |
| *Melampsora lini* | Flax rust | Flax |
| *Ustilago maydis* | Corn smut | Corn |

According to a specific embodiment, the fungus is selected from the division Ascomycota and Oomycota.

According to a specific embodiment, the fungus is from the division Ascomycota.

According to a specific embodiment, the fungus is selected from the group consisting of *Botrytis, Plenodomus tracheiphilus* syn *Phoma tracheiphila, Sclerotinia sclerotiorum* and *Alternaria*.

According to a specific embodiment, the fungus is from the division Oomycota.

According to a specific embodiment, the fungus is *Pythium aphanidermatum*.

As used herein the term "*Botrytis*" or "*Botrytis* sp." refers to the fungal pathogen that is responsible for many of the pre- and post-harvest molds which attack plant parts and cause gray mold in susceptible plants.

According to some embodiments, the *Botrytis* species is selected from the group consisting of *Botrytis cinerea, B. aclada (B. allii), B. anemone, B. byssoidea, B. calthae, B. caroliniana, B. convoluta, B. croci, B. douglasii, B. elliptica, B. fabae, B. fabiopsis, B. ficariarum, B. galanthina, B. gladiolorum, B. globosa, B. hyacinthi, B. narcissicola, B. paeoniae, B. pelargonii, B. polyblastis, B. porri, B. ranunculi, B. sinoallii, B. squamosa, B. sphaerosperma, B. tulipae.*

Other *Botrytis* species are also contemplated.

According to a specific embodiment, the *Botrytis* species is *Botrytis cinerea*.

A plant susceptible to *Botrytis* infection, as used herein, refers to a plant that can be infected with *Botrytis* and exhibits disease symptoms resultant of said infection (e.g., mould lesions, grey rot, noble rot, leaf spots (lesions). Environmental conditions, e.g., growth conditions or storage conditions such as light, humidity and temperature are much associated with disease spread. The skilled artisan would recognize that treatment with phenylalanine or analog thereof is beneficial under those conditions that support *Botrytis* infection. There are over 1400 plant species affected by *Botrytis* (susceptible to infection).

A comprehensive list is provided in Elad et al., 2016 (supra), which is hereby incorporated by reference in its entirety.

Non-limiting examples of plants susceptible to *Botrytis* infection is listed infra. Potato, canola, maize, alfalfa, African daisy, African violet, pea, lentil, anemone, almond, apple, apricot, asparagus, avocado, azalea, beet, bellflower, bleeding heart, butterfly flower, cranberries, carrot, tea, tobacco, tomato, *verbena*, sweet potato, sunflower, strawberry, sapphire flower, safflower, rose, *primula*, poinsettia, pocketbook plant, pistachio, pigeonpea, Persian violet, *Capsicum*, pear, peanut, peach, nectarine, mimulus, monkeyflower, mango, lettuce, kalanchoe, Jerusalem cherry, *impatiens*, hop, hemp, grape, geranium, fuchsia, cyclamen, cucurbit, crucifer, citrus, *cineraria*, chickpea, cattleya, carnation, Douglas-fir, dahlia, Araceae, Acanthaceae, Agavaceae, Araliaceae, Asclepiadaceae, Gesneriaceae, *Ficus*, Polypodiaceae), Vitaceae, *rhododendron*, Stonefruit.

According to a specific embodiment, the plant is not an ornamental plant (e.g., African daisy, bellflower, butterfly flower, sunflower, sapphire flower, safflower, rose, poinsettia, monkey-flower, geranium, fuchsia, carnation, dahlia, Araceae, Acanthaceae, Agavaceae, Araliaceae, Asclepiadaceae, Gesneriaceae, *Ficus*, Polypodiaceae, Vitaceae, *rhododendron*).

Non-limiting examples of plants susceptible to *Botrytis* infection is listed infra. Potato, canola, maize, alfalfa, African violet, pea, lentil, anemone, almond, apple, apricot, asparagus, avocado, azalea, beet, bleeding heart, caneberries, carrot, tea, tobacco, tomato, *verbena*, sweet potato, strawberry, *primula*, pocketbook plant, pistachio, pigeonpea, Persian violet, *Capsicum*, pear, peanut, peach, nectarine, mimulus, mango, lettuce, kalanchoe, Jerusalem cherry, *impatiens*, hop, hemp, grape, cyclamen, cucurbits, crucifers, citrus, *cineraria*, chickpea, cattleya, Douglas-fir, Stonefruits.

According to a specific embodiment, said plant susceptible to *Botrytis* infection is a cultivated fruit plant.

According to a specific embodiment, the cultivated fruit plant, refers to a plant which fruits are of an economic value.

According to a specific embodiment, the economic value is a nutritional value.

According to a specific embodiment, the cultivated fruit plant is an edible plant (or has edible fruit).

According to a specific embodiment, the cultivated fruit plant is selected from the group consisting of strawberries, grapes, apples, blueberries, cherries.

According to a specific embodiment, the plant susceptible to *Botrytis* infection is selected from the group consisting of beans, cabbage, carrots, onions and cucumbers.

According to a specific embodiment, the plant is not a snapdragon, *petunia* or lisianthus.

According to a specific embodiment, the cultivated fruit plant is not strawberry, peach, apple, orange, lemon, lime, plum, cherry, raspberry, blackberry, tomato, pepper, melon, cucumber, squash, watermelon (when applied to grains or fruits).

According to a specific embodiment the plant is selected from the group consisting of *petunia*, tomato, sweet basil, cucumber, avocado and lemon.

As used herein the term, "Phenylalanine" or "Phe" refers to the α-amino acid with the formula $C_9H_{11}NO_2$. It can be viewed as a benzyl group substituted for the methyl group of alanine, or a phenyl group in place of a terminal hydrogen of alanine. This essential amino acid is classified as neutral, and nonpolar because of the inert and hydrophobic nature of the benzyl side chain. The L-isomer is used to biochemically form proteins, coded for by DNA. The codons for L-phenylalanine are UUU and UUC. Phenylalanine is a precursor for tyrosine; the monoamine neurotransmitters dopamine, norepinephrine (noradrenaline), and epinephrine (adrenaline); and the skin pigment melanin.

An "analog of Phenylalanine" or "Phe" refers to a naturally occurring composition or synthetic analog of Phe which is capable of controlling fungal e.g., *Botrytis* infection in a plant. Without being bound by theory it is suggested that the Phe or analog thereof functions by increasing the shikamate pathway in the plant and specifically production of phenylpropanoids.

According to a specific embodiment, the Phe analog is a naturally occurring composition.

According to a specific embodiment, the Phe analog is aromatic.

According to a specific embodiment, the Phe analog is Tyrosine or a syntheric analog thereof which is capable of controlling fungal e.g., *Botrytis*, infection.

Synthetic analogs are commercially available such as from AnaSpec.

A non-limiting example list is provided infra. Measures are taken to test for phyto-toxicity before applying onto the plant.

(2R, 3R)-Boc-β-methyl-phenylalanine
(2R, 3R)-Boc-β-methyl-phenylalanine
(2R, 3R)/(2S, 3S)-Racemic-Boc-β-methyl-phenylalanine
(2R, 3S)/(2S, 3R)-Racemic Boc-β-hydroxyphenylalanine
(2R, 3S)/(2S, 3R)-Racemic Boc-β-hydroxyphenylalanine
(2R, 3S)/(2S, 3R)-Racemic Fmoc-β-hydroxyphenylalanine
(2R, 3S)/(2S, 3R)-Racemic Fmoc-β-hydroxyphenylalanine
(2S, 3S)-Boc-β-methyl-phenylalanine
(2S, 3S)-Boc-β-methyl-phenylalanine
Boc-α-methyl-3-methoxy-DL-phenylalanine
Boc-α-methyl-3-methoxy-DL-phenylalanine
Boc-α-methyl-D-phenylalanine
Boc-α-methyl-L-phenylalanine
Boc-α-methyl-L-phenylalanine
Boc-β-methyl-DL-phenylalanine
Boc-β-methyl-DL-phenylalanine
Boc-(R)-1,2,3,4-tetrahydroisoquino-line-3-carboxylic acid
Boc-D-Tic-OH
Boc-(R)-1,2,3,4-tetrahydroisoquino-line-3-carboxylic acid
Boc-D-Tic-OH
Boc-(S)-1,2,3,4-tetrahydroisoquinoline-line-3-carboxylic acid
Boc-L-Tic-OH
Boc-(S)-1,2,3,4-tetrahydroisoquinoline-line-3-carboxylic acid
Boc-L-Tic-OH
Boc-2,4-dichloro-D-phenylalanine
Boc-2,4-dichloro-L-phenylalanine
Boc-2-(trifluoromethyl)-D-phenylalanine
Boc-2-(trifluoromethyl)-L-phenylalanine
Boc-2-bromo-D-phenylalanine
Boc-2-bromo-L-phenylalanine
Boc-2-bromo-L-phenylalanine
Boc-2-chloro-D-phenylalanine
Boc-2-chloro-L-phenylalanine
Boc-2-cyano-D-phenylalanine
Boc-2-cyano-L-phenylalanine
Boc-2-cyano-L-phenylalanine
Boc-2-fluoro-D-phenylalanine
Boc-2-fluoro-L-phenylalanine
Boc-2-methyl-D-phenylalanine
Boc-2-methyl-L-phenylalanine
Boc-2-nitro-D-phenylalanine
Boc-2-nitro-L-phenylalanine
Boc-2;4;5-trihydroxy-DL-phenylalanine
Boc-3,4,5-trifluoro-D-phenylalanine
Boc-3,4,5-trifluoro-L-phenylalanine
Boc-3,4-dichloro-D-phenylalanine
Boc-3,4-dichloro-L-phenylalanine
Boc-3,4-difluoro-D-phenylalanine
Boc-3,4-difluoro-L-phenylalanine
Boc-3,4-dihydroxy-L-phenylalanine
Boc-3,4-dihydroxy-L-phenylalanine
Boc-3,4-dimethoxy-L-phenylalanine
Boc-3,5,3'-triiodo-L-thyronine
Boc-3,5-diiodo-D-tyrosine
Boc-3,5-diiodo-L-thyronine
Boc-3,5-diiodo-L-tyrosine
Boc-3-(trifluoromethyl)-D-phenylalanine
Boc-3-(trifluoromethyl)-L-phenylalanine
Boc-3-amino-L-tyrosine
Boc-3-amino-L-tyrosine
Boc-3-bromo-D-phenylalanine
Boc-3-bromo-L-phenylalanine
Boc-3-chloro-D-phenylalanine
Boc-3-chloro-D-phenylalanine
Boc-3-chloro-L-phenylalanine
Boc-3-chloro-L-phenylalanine
Boc-3-chloro-L-tyrosine
Boc-3-cyano-D-phenylalanine
Boc-3-cyano-L-phenylalanine
Boc-3-cyano-L-phenylalanine
Boc-3-fluoro-D-phenylalanine
Boc-3-fluoro-DL-tyrosine
Boc-3-fluoro-DL-tyrosine
Boc-3-fluoro-L-phenylalanine
Boc-3-iodo-D-phenylalanine
Boc-D-Phe(3-I)-OH
Boc-3-iodo-L-phenylalanine
Boc-Phe(3-I)-OH
Boc-3-iodo-L-phenylalanine
Boc-Phe(3-I)-OH
Boc-3-iodo-L-tyrosine
Boc-3-iodo-L-tyrosine
Boc-3-methyl-D-phenylalanine
Boc-3-methyl-L-phenylalanine
Boc-3-nitro-D-phenylalanine
Boc-3-nitro-L-phenylalanine
Boc-3-nitro-L-tyrosine
Boc-3-nitro-L-tyrosine
Boc-4-(Fmoc-aminomethyl)-D-phenylalanine
Boc-4-(Fmoc-aminomethyl)-L-phenylalanine
Boc-4-(trifluoromethyl)-D-phenylalanine
Boc-4-(trifluoromethyl)-L-phenylalanine
Boc-4-amino-D-phenylalanine
Boc-4-amino-D-phenylalanine
Boc-4-amino-L-phenylalanine
Boc-4-amino-L-phenylalanine
Boc-4-benzoyl-D-phenylalanine
Boc-D-Bpa-OH
Boc-4-benzoyl-L-phenylalanine
Boc-L-Bpa-OH
Boc-4-benzoyl-L-phenylalanine
Boc-L-Bpa-OH
Boc-4-bis(2-chloroethyl)amino-L-phenylalanine
Boc-4-bromo-D-phenylalanine
Boc-4-bromo-D-phenylalanine
Boc-4-bromo-L-phenylalanine
Boc-4-bromo-L-phenylalanine
Boc-4-chloro-D-phenylalanine
Boc-4-chloro-L-phenylalanine
Boc-4-chloro-L-phenylalanine
Boc-4-cyano-D-phenylalanine
Boc-4-cyano-L-phenylalanine
Boc-4-cyano-L-phenylalanine
Boc-4-fluoro-D-phenylalanine
Boc-4-fluoro-L-phenylalanine
Boc-4-fluoro-L-phenylalanine -continued Boc-4-iodo-D-phenylalanine
Boc-4-iodo-L-phenylalanine
Boc-4-iodo-L-phenylalanine
Boc-4-methyl-D-phenylalanine
Boc-4-methyl-L-phenylalanine
Boc-4-nitro-D-phenylalanine
Boc-4-nitro-L-phenylalanine
Boc-5-bromo-2-methoxy-D-phenylalanine
Boc-5-bromo-2-methoxy-L-phenylalanine
Boc-7-hydroxy-(R)-1,2,3,4-tetrahydroisoquinoline-3-carboxylic acid
Boc-hydroxy-D-Tic-OH
Boc-7-hydroxy-(R)-1,2,3,4-tetrahydroisoquinoline-3-carboxylic acid
Boc-hydroxy-D-Tic-OH
Boc-7-hydroxy-(S)-1,2,3,4-tetrahydroisoquinoline-3-carboxylic acid
Boc-hydroxy-Tic-OH
Boc-7-hydroxy-(S)-1,2,3,4-tetrahydroisoquinoline-3-carboxylic acid
Boc-hydroxy-Tic-OH
Boc-D-3,3-diphenylalanine
Boc-D-homophenylalanine
Boc-D-homophenylalanine
Boc-D-pentafluorophenylalanine According to a specific embodiment, the analog is Aspartame.

According to a specific embodiment, the analog is Tyrosine.

As mentioned, phenylalanine is applied in an effective amount to control fungal e.g., *Botrytis* infection.

According to a specific embodiment the phenylalanine is administered in an amount of 0.01-50 mM, 0.1-50 mM 0.5-50 mM e.g., 0.5-30 mM, 1-50 mM, 5-50 mM, 10-50 mM, 10-30 mM, 5-30 mM, 1-30 mM, 10-20 mM, 0.5-20 mM, 5-20 mM, 1-20 mM, 1-15 mM, 15 to 30 mM or up to 50 mM.

It may be possible to use low concentration (e.g., 0.01-10 mM, 0.01-5 mM, 0.01-1 mM, 0.1-10 mM, 0.1-5 mM, 0.1-1 mM) of Phe or analog thereof especially when used in conjunction with a surfactant or when combinations of Phe and analogs are used (e.g., Phe+Tyr).

As used herein "plant" refers to whole plants, a grafted plant including seeds, shoots, stems, roots (including tubers), rootstock, scion, and plant cells, tissues and organs. The plant may be in any form including cuttings and harvested material (e.g., fruit).

The Phe (or analog) can be applied to plants by spraying, dusting, coating, soaking, irrigation, drenching or otherwise treating them with the active ingredients or alternatively, by treating with the active ingredients the plant seeds, the soil around the plant, or the soil, rice pads or the water for hydroponic culture where the seeds are to be sown. The application may be effected either before or after the plant is infected with a fungus e.g., *Botrytis* According to a specific embodiment, the regimen is performed such as to control the fungus e.g., *Botrytis*.

According to a specific embodiment, applying comprises pre-harvest applying.

According to a specific embodiment, said applying comprises post-harvest applying.

According to a specific embodiment, said applying comprises pre-harvest applying and not post-harvest applying.

According to a specific embodiment, said applying comprises post-harvest applying and not pre-harvest applying.

According to a specific embodiment, said plant is at a post-blossom stage.

According to a specific embodiment, said plant is at a blossom stage.

According to a specific embodiment, said plant is at a pre-blossom stage.

When indicated a specific stage, the application can be confined only to this stage or to the recited stage and more. For instance, when indicated applying at blossom, applying can be effected at blossom or blossom+post-blossom (i.e., fruit), or pre-blossom+blossom or pre-blossom+blossom+post blossom.

According to a specific embodiment, applying is post-emergence.

According to a specific embodiment, said phenylalanine or said analog is formulated in a composition selected from the group consisting of a dip, a spray or a concentrate.

According to a specific embodiment, said applying is in the vicinity of or onto the roots, stems, trunk, seed, fruits or leaves of the plant.

According to a specific embodiment, said applying is by irrigation, drenching, dipping, soaking, injection, coating or spraying.

According to a specific embodiment, said applying is in an open field.

According to a specific embodiment, said applying is in a greenhouse According to a specific embodiment, said applying is in a storage facility (e.g., dark room, refrigerator).

According to a specific embodiment, said applying is effected once.

According to a specific embodiment, said applying comprises repeated application (2 or more applications e.g., every week). Repeated applications are especially envisaged for field/greenhouse treatments.

According to a specific embodiment, said repeated application comprises weekly administration during blossom pre-harvest.

For example, suggested regimen include but are not limited to, spraying plants in open fields and green house, adding to irrigation of plants grown in the open field, green house and in pots, dipping the whole foliage branch in the solution post harvest, adding to vase of cut flowers after harvest and before shipment.

According to a specific embodiment, the active ingredient (Phe and/or analog) is formulated into a composition where it is mixed with other active ingredients (e.g., fungicides) and/or agriculturally acceptable carrier".

According to a specific embodiment such a composition of the invention is shelf stable. The term "shelf stable" refers to a composition of the invention that maintains its activity throughout a given storage period at the recommended conditions (e.g., temperature) and optionally does not separate out into separate phases or develop any offensive odours.

As used herein the term "agriculturally acceptable carrier" refers to a material that facilitates application of a composition of the invention to the intended subject, which may for example be a plant, plant material or equipment, or that facilitates storage, transport or handling. Carriers used in compositions for application to plants and plant material are preferably non-phytotoxic or only mildly phytotoxic. A suitable carrier may be a solid, liquid or gas depending on the desired formulation. In one embodiment the carriers include polar liquid carriers such as water, mineral oils and vegetable oils.

Examples of liquid carriers include but are not limited to water; alcohols, particularly butanol or glycol, as well as their ethers or esters, particularly methylglycol acetate; ketones, particularly acetone, cyclohexanone, methylethyl ketone, methylisobutylketone, or isophorone; petroleum fractions such as paraffinic or aromatic hydrocarbons, particularly xylenes or alkyl naphthalenes; mineral or vegetable oils; aliphatic chlorinated hydrocarbons, particularly trichloroethane or methylene chloride; aromatic chlorinated hydrocarbons, particularly chlorobenzenes; water-soluble or strongly polar solvents such as dimethylformamide, dimethyl sulfoxide, or N-methylpyrrolidone; liquefied gases; or the like or a mixture thereof.

Examples of solid carriers include but are not limited to fillers such as kaolin, bentonite, dolomite, calcium carbonate, talc, powdered magnesia, Fuller's earth, gypsum, diatomaceous earth and China clay.

A carrier which provides for slow or delayed release of a compound (Phe or analog) of the invention may also be included in a composition of the invention (especially because of the short life cycle of the *Botrytis*).

In another embodiment, a composition (or active ingredient thereof—Phe or analog) of the invention is applied in an amount able to inhibit germination of fungal spores.

According to a specific embodiment, the composition (or active ingredient thereof—Phe or analog) of the invention is applied in an amount able to reduce the standard concentration advised by the regulatory agencies (e.g., FDA) of commonly used fungicides.

According to a specific embodiment, the composition (or active ingredient thereof—Phe or analog) of the invention is applied in an amount able to reduce necrosis or chlorosis.

As used herein "increasing" or "decreasing" or "reducing" refers to about +/− at least 10%, 20%, 30%, 40%, 50%, 60%, 70%, 80%, 90% or more compared to a control plant in the absence of said Phe or analog under identical assay conditions.

Applying may be directly to the plant or to a surface in sufficient vicinity to the plant to control *Botrytis* infection of the plant.

Thus, applying can be to any target surface to which a compound or composition of the invention may be applied, for example to a plant, plant material including roots, bulbs, tubers, corms, leaves, flowers, seeds, stems, callus tissue, nuts, grains, fruit, cuttings, root stock, scions, harvested crops including roots, bulbs, tubers, corms, leaves, flowers, seeds, stems, callus tissue, nuts, grains, fruit, cuttings, root stock, scions, or any surface that may contact harvested crops including harvesting equipment, packaging equipment and packaging material.

For surfaces such as harvesting equipment, packaging equipment and packaging material, the compound or composition of the invention is applied before use of the harvesting equipment, packaging equipment or packaging material.

According to a specific embodiment, the compound or composition of the invention is formulated as a dip, a powder, a spray or a concentrate.

According to a specific embodiment, the formulation comprises a surfactant, which may be used in spraying for example.

According to a specific embodiment, the surfactant is a cationic surfactant, e.g., benzalkonium chloride, cetylpyridinium chloride.

According to a specific embodiment, the surfactant is an anionic surfactant, e.g., alkyl sulphates, alkyl ethoxylate sulphates.

According to a specific embodiment, the surfactant is a non-ionic surfactant, e.g., Alkyl polyglycoside, Triton X-100, Polyoxyethylene (20) sorbitan monooleate (Tween-80), Silwett L-77.

According to a specific embodiment, the surfactant is Tween-80 or Silwett L-77.

According to a specific embodiment, the concentration of the surfactant is about 0.1%. In one embodiment, a composition of the invention may further comprise at least one additional agricultural agent. In an alternative embodiment a composition of the invention may be delivered separately, simultaneously or sequentially with at least one additional agricultural agent.

In one embodiment, a composition of the invention may further comprise at least one additional fungicide. In an alternative embodiment a composition of the invention may be delivered separately, simultaneously or sequentially with at least one additional fungicide.

When formulating a composition of the invention containing an additional agricultural agent such as an additional fungicide or planning delivery of a composition of the invention separately, simultaneously or sequentially with an additional agricultural agent such as an additional fungicide it may be desirable to assess the degree of phytotoxicity resulting from application of the compositions to plant material over time. This may be assessed according to the methodology well known in the art.

Assessment of a composition of the invention or a composition of the invention including or delivered with an additional agricultural agent such as an additional fungicide may include assessment of: (1) Degree of control of *Botrytis* without stimulating growth of undesirable non-target microbes or harming beneficial organisms. (2) Durability of control. (3) Degree of phytotoxicity and effects on plant development when used repeatedly throughout a portion or the entirety of a growing season. (4) Compatibility with other control products used in the industry.

As described above, the compositions of the present invention may be used alone or in combination with one or more other agricultural agents, including pesticides, insecticides, acaracides, fungicides, bactericides, herbicides, antibiotics, antimicrobials, nematocides, rodenticides, entomopathogens, pheromones, attractants, plant growth regulators, plant hormones, insect growth regulators, chemosterilants, microbial pest control agents, repellents, viruses, phagostimulants, plant nutrients, plant fertilisers and biological control agents. When used in combination with other agricultural agents the administration of the two agents may be separate, simultaneous or sequential. Specific examples of these agricultural agents are known to those skilled in the art, and many are readily commercially available.

Examples of plant nutrients include but are not limited to nitrogen, magnesium, calcium, boron, potassium, copper, iron, phosphorus, manganese, molybdenum, cobalt, boron, copper, silicon, selenium, nickel, aluminum, chromium and zinc.

Examples of antibiotics include but are not limited to oxytetracyline and streptomycin.

Examples of fungicides include but are not limited to the following classes of fungicides: carboxamides, benzimidazoles, triazoles, hydroxypyridines, dicarboxamides, phenylamides, thiadiazoles, carbamates, cyano-oximes, cinnamic acid derivatives, morpholines, imidazoles, beta-methoxy acrylates and pyridines/pyrimidines.

Further examples of fungicides include but are not limited to natural fungicides, organic fungicides, sulphur-based fungicides, copper/calcium fungicides and elicitors of plant host defences.

Examples of natural fungicides include but are not limited to whole milk, whey, fatty acids or esterified fatty acids.

Examples of organic fungicides include but are not limited to any fungicide which passes an organic certification standard such as biocontrol agents, natural products, elicitors (some of may also be classed as natural products), and sulphur and copper fungicides (limited to restricted use).

An example of a sulphur-based fungicide is Kumulus™ DF (BASF, Germany).

An example of a copper fungicide is Kocide® 2000 DF (Griffin Corporation, USA).

Examples of elicitors include but are not limited to chitosan, Bion™, BABA (DL-3-amino-n-butanoic acid, beta-aminobutyric acid) and Milsana™ (Western Farm Service, Inc., USA).

In some embodiments non-organic fungicides may be employed. Examples of non-organic fungicides include but are not limited to Bravo™ (for control of powdery mildew (PM) on cucurbits); Supershield™ (Yates, NZ) (for control of *Botrytis* and PM on roses); Topas® 200EW (for control of PM on grapes and cucurbits); Flint™ (for control of PM on apples and cucurbits); Amistar® WG (for control of rust and PM on cereals); and Captan™, Dithane™, Euparen™, Rovral™, Scala™, Shirlan™, Switch™ and Teldor™ (for control of *Botrytis* on grapes).

Examples of pesticides include but are not limited to azoxystrobin, bitertanol, carboxin, Cu.sub.2O, cymoxanil, cyproconazole, cyprodinil, dichlofluamid, difenoconazole, diniconazole, epoxiconazole, fenpiclonil, fludioxonil, fluquiconazole, flusilazole, flutriafol, furalaxyl, guazatin, hexaconazole, hymexazol, imazalil, imibenconazole, ipconazole, kresoxim-methyl, mancozeb, metalaxyl, R-metalaxyl, metconazole, oxadixyl, pefurazoate, penconazole, pencycuron, prochloraz, propiconazole, pyroquilone, SSF-109, spiroxamin, tebuconazole, thiabendazole, tolifluamid, triazoxide, triadimefon, triadimenol, triflumizole, triticonazole and uniconazole.

An example of a biological control is the BotryZen™ biological control agent comprising *Ulocladium oudemansii*.

Efficacy of compositions of the invention may also be confirmed using field trial assay systems. For example, confirmation of the ability of compositions of the invention to prevent fungal growth may be obtained by applying a compound or composition of the invention to plant material and then inoculating with a target organism. Efficacy is confirmed by the absence of growth or less growth of the target organism than an untreated control.

According to a specific embodiment the agricultural composition may comprise phenylalanine or an analog thereof and a surfactant (as described herein) for controlling a fungus infection in a plant.

According to a specific embodiment the agricultural composition may comprise phenylalanine and tyrosine for controlling a fungus infection in a plant.

Confirmation of the ability of compositions of the invention to treat fungal growth may be obtained by inoculating plant material with a target organism and then applying a composition of the invention. Efficacy is confirmed by a reduction in the degree of growth or the disappearance of the target organism compared to an untreated control.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Generally, the nomenclature used herein and the laboratory procedures utilized in the present invention include molecular, biochemical, microbiological and recombinant DNA techniques. Such techniques are thoroughly explained in the literature. See, for example, "Molecular Cloning: A laboratory Manual" Sambrook et al., (1989); "Current Protocols in Molecular Biology" Volumes I-III Ausubel, R. M., ed. (1994); Ausubel et al., "Current Protocols in Molecular Biology", John Wiley and Sons, Baltimore, Maryland (1989); Perbal, "A Practical Guide to Molecular Cloning", John Wiley & Sons, New York (1988); Watson et al., "Recombinant DNA", Scientific American Books, New York; Birren et al. (eds) "Genome Analysis: A Laboratory Manual Series", Vols. 1-4, Cold Spring Harbor Laboratory Press, New York (1998); methodologies as set forth in U.S. Pat. Nos. 4,666,828; 4,683,202; 4,801,531; 5,192,659 and 5,272,057; "Cell Biology: A Laboratory Handbook", Volumes I-III Cellis, J. E., ed. (1994); "Current Protocols in Immunology" Volumes I-III Coligan J. E., ed. (1994); Stites et al. (eds), "Basic and Clinical Immunology" (8th Edition), Appleton & Lange, Norwalk, CT (1994); Mishell and Shiigi (eds), "Selected Methods in Cellular Immunology", W. H. Freeman and Co., New York (1980); available immunoassays are extensively described in the patent and scientific literature, see, for example, U.S. Pat. Nos. 3,791,932; 3,839,153; 3,850,752; 3,850,578; 3,853,987; 3,867,517; 3,879,262; 3,901,654; 3,935,074; 3,984,533; 3,996,345; 4,034,074; 4,098,876; 4,879,219; 5,011,771 and 5,281,521; "Oligonucleotide Synthesis" Gait, M. J., ed. (1984); "Nucleic Acid Hybridization" Hames, B. D., and Higgins S. J., eds. (1985); "Transcription and Translation" Hames, B. D., and Higgins S. J., Eds. (1984); "Animal Cell Culture" Freshney, R. I., ed. (1986); "Immobilized Cells and Enzymes" IRL Press, (1986); "A Practical Guide to Molecular Cloning" Perbal, B., (1984) and "Methods in Enzymology" Vol. 1-317, Academic Press; "PCR Protocols: A Guide To Methods And Applications", Academic Press, San Diego, CA (1990); Marshak et al., "Strategies for Protein Purification and Characterization—A Laboratory Course Manual" CSHL Press (1996); all of which are incorporated by reference as if fully set forth herein. Other general references are provided throughout this document. The procedures therein are believed to be well known in the art and are provided for the convenience of the reader. All the information contained therein is incorporated herein by reference.

Materials and Methods for Examples 1-2

Plant Material and Growth Conditions:
Petunia (Petunia×hybrida) V26 variety, and a commercial white flowered cultivar (Dream White) cultivars were used. Petunia plants were grown as described in Oliva et al., (2015). Arabidopsis plants were grown as described in Tzin et al., (2012).

Fungal Material and Infection Method
Conidia of Botrytis cinerea strain BO-05 were grown on PDA medium for 10 days. Conidia were gently collected from the plate in sterile water and were diluted to $10^6$ conidia/ml. Fresh leaves of similar age and size of Petunia or Arabidopsis were detached from the plant, washed with water and placed in a humid chamber, under artificial light at 22° C. The upper side of the leaves was wounded (1-2 mm) and 5 µl drops of conidia suspension at a concentration of $10^6$ conidia/ml were placed on the artificial wound. Decay diameter was measured following inoculation in specific days post inoculation (dpi) as detailed in the results.

DCF Stain
Leaves were immersed in 10 µM 2', 7'-Dichlorodihydrofluorescein diacetate (DCFH-DA) (ThermoFischer) in PBS for 15 min in the dark at room temperature, then the leaves were rinsed with PBS, two times. The leaves were imaged under a fluorescence binocular with a GFP3 filter (Leica MZFLIII) and green fluorescence was quantified with Image J version 1.44 (NIH).

Treatment of Leaves with Phenylalanine
Petunia leaves were dipped for 10 min in double distilled water with 0.02% Silwett L-77 surfactant supplemented either with 15 mM or 0 mM phenylalanine. Leaves were then placed in a humid box, and wound inoculated with B. cinerea was performed as described above.

Statistics
Statistical significance analysis was calculated either by t-test or by one-way ANOVA using JMP software.

Example 1

Plants Treated with Phenylalanine Present Higher Resistance to the Pathogen

The question whether external treatment of petunia leaves with Phe increases resistance to B. cinerea pathogen, due to increased phenylpropanoids was addressed. Petunia detached leaves were treated with Phe and subjected to artificial B. cinerea inoculation. The diameter of decay in the Phe treated control leaves was significantly smaller, 7 days post inoculation, in comparison to non-treated controls (FIGS. 1A-B). Indeed, both the severe symptom of necrosis and the milder symptoms of chlorosis were reduced in response to application of Phe (FIG. 1C).

External Phe treatment of foliage increases their resistance to B. cinerea. This is the first report suggesting that feeding of Phe as an antifungal treatment of plants.

In an independent experiment the decay diameter of detached leaves of wild type petunia (V26 cultivar) treated with 15 mM Phe or with $H_2O_2$. Leaves were treated with Phe by dipping them for 10 min in double distilled water with 0.02% Silwett L-77 surfactant supplemented either with 15 mM or 0 mM phenylalanine (controls). Treatment with Phe solution was just prior to infection with Botrytis cinerea (strain BO-05). Inoculation was performed by slightly wounding leaves (1-2 mm), and adding about 5 µl botrytis solution at a concentration of $10^6$ spores/ml (Conidia of Botrytis cinerea strain BO-05) grown on PDA medium for 10 days. Conidia were gently collected from the plate using sterile water and were diluted to $10^6$ conidia/ml). The inoculated detached leaves were placed in a humid box, under artificial light at 22° C.

Necrotic area was measured at 3, 4 and 7 days post inoculation (dpi). Averages±SE results are presented for 25 leaves, as decay area in mm*2. Asterisks (*) represent statistically significant differences between the transgenic lines and control, using t-tests, p≤0.05 (FIG. 1D). Photographs of leaves with and without Phe treatment at day 4 from inoculation (FIG. 1E upper panel), and bright field imaging of inoculated area 11 dpi (FIG. 1E, lower panel).

Example 2

Disease Control in Tomato Plants

Materials and Methods
Plants
Tomato plants (tomato cultivar-Brigate) were grown from seeds in a nursery and transplanted into 1 liter pots at 40 to 50 days following seeding in an unheated greenhouse. Plants were fertilized proportionally with drippers 2-3 times per day with 5:3:8 NPK fertilizer (irrigation water was planned to have total N, P and K concentrations of 120, 30 and 150 mg/L, respectively; EC 2.2 dS/m), allowing for 25-50% drainage. Plants were maintained at 20-30° C. with natural light, and relative humidity of 50-90% in a pest- and disease-free greenhouse during the growth period and then transferred to an area where disease was allowed to develop following pathogen infection on intact leaves as described below.

Pathogen: Growth, Harvesting, Infection and Evaluation of Conferred Disease Severity Gray Mold Inducing Pathogen

*Botrytis cinerea* [Pers.:Fr. [Teleomorph: *Botryotinia fuckeliana* (de Bary) Whetzel] (isolate BcI16; [Swartzberg D. et al., Eur. J. Plant Pathol., 2008, 120:289-297])] was cultured on potato dextrose agar (PDA, Difco, Detroit, MI) in 90 mm diam. petri plates containing 15 ml PDA each and incubated at 20° C. The inoculum was maintained on PDA and transferred every two weeks. Gray mold conidia were harvested from 10 to 14 day-old cultures by agitating 1 cm$^2$ of agar bearing mycelium and conidia in a glass tube with tap water. The suspension was then filtered through cheesecloth. The concentration of conidia was determined using a haemocytometer and a light microscope, and adjusted to $5 \times 10^5$ conidia/ml. Since *B. cinerea* conidia need carbon and phosphate for germination and penetration, 0.1% glucose was added to the final conidial suspension together with 0.1% $KH_2PO_4$. These supplements have been shown to facilitate germination of *B. cinerea* conidia and subsequent leaf infection.

Plant attached tomato leaves were examined. Whole plants were kept in a humidity chamber at 22±1° C., 97±3% RH, and 1020 lux light intensity. Plants were infected by placing 10 µL drops of a $5 \times 10^5$ conidia/ml suspension, 5 drops/leaf (one drop on each leaflet), on two mature leaves.

Disease severity was evaluated on each plant using a pictorial key; 0=no infection (infection site is symptomless) and 100=all infection site fully covered by gray mold symptoms. The analyses were performed in the mentioned plants.

The temperature of the growth room was kept at 20±1° C. and 75-90% RH during the course of the experiments.

Phenylalanine Treatment

Phenylalanine treatment consisted of either spray or drench at concentrations of 0.5-4.1 mM administrated 3 and 0 days before infection with *B. cinerea*. Control plants were treated by water and kept under the same conditions as mentioned above.

Statistical Analysis

Treatments in experiments were replicated 5 times. Replicates of each treatment were arranged randomly. Disease severity data in percentages were arcsin-transformed before further analysis. Disease severity data were analyzed using ANOVA and Fisher's protected LSD test and disease levels were statistically separated (P≤0.05) following a one-way analysis of variance.

Results

Control of Gray Mold by Phenylalanine

Disease severity is reduced significantly when the phenylalanine is applied as drench to the root zone at concentrations of 0.5 to 4.1 mM (FIG. 2A) and when the phenylalanine is sprayed on the plants at concentration of 1.0 to 4.1 mM (FIG. 2B).

Example 3

Treatment of Whole *Petunia* Plants, Either by Spraying the Plants or Drenching the Pots with Exogenous Phenylalanine Increases Tolerance to *B. cinerea*

Inoculation with *B. cinerea* was performed 3 days after Phe treatment. In this case only one Phe treatment was performed however multiple treatments can be used e.g., first-three days prior to inoculation and a second one on the day of inoculation (data not shown but results are similar). 18 leaves were inoculated with *B. cinerea*, as described above. The plants were covered with a nylon bag and kept in the light and 22° C. (as above). Decay area (mm*2) results are presented as averages±SE and shown in FIGS. 2C-2D.

Of note, 4.1 mM Phe was compared with 6 mM Phe and the degree of resistance was a little lower, supporting a dose response as further confirmed hereinbelow.

Example 4

The Tolerance of Plants to *Botrytis cinerea* Increases with Phe Treatment in a Dose Responsive Manner, Either by Spraying the Plants or Drenching the Pots Commercial *petunia* plants ('Dream Heaven') were treated as described above in Example 3, either by spraying the plants (FIG. 3A) or drenching the pots (FIG. 3B), this time with increasing concentrations of Phe (6-50 mM).

In both cases, as can be seen in FIGS. 3A-B, the higher Phe concentrations caused increased resistance of the plants to *B. cinerea*, and the resistance lasted for a longer time. 7 days after spraying and 10 days after drenching the pots with the Phe solutions, plants that were treated with higher Phe concentrations (35 and 50 mM) showed no increased decay area. Still images of the plants are shown for the various treatments in FIGS. 3C-D.

Similar results were obtained for tomato plants (FIG. 3C). Specifically, tomato plants were sprayed with increasing concentrations of Phe solutions (0.5-30 mM aquatic solution of Phe, no detergent) and percent disease severity was determined 11 days following treatment. In addition, the higher concentrations, such as 20 and 30 mM caused increased resistance for a longer period of time (results not shown).

The addition of a surfactant (0.01% Tween 80) to the Phe solution improved the effect of increased resistance to *B. cinerea* (FIG. 3D).

Example 5

Treatment of Cut *Ruscus* Branches with Exogenous Phenylalanine Increases Tolerance to *B. cinerea*

*Ruscus* branches serve as an ornamental decorative. These plants are very susceptible to *Botrytis*. Cut branches were treated with Phe either by drenching the tip of the cut branch in the Phe solution (FIG. 4B), or dipping the whole cut branch in Phe solution for an hour before dipping it in water and inoculating with *botrytis*. In both treatments the concentration used was 6 mM phenylalanine, and for the drenching treatment an additional concentration of 20 mM was added (FIG. 4A). For the dipping experiment 50 ppm T.O.G-6 was added to the Phe solution to prevent bacterial growth during the days of the experiment. Control branches were drenched in water and dipped in water with 50 ppm T.O.G-6. *Ruscus* leaves were wounded and inoculated with *B. cinerea* as described in the above Examples. Decay area (mm*2) results are presented as averages of 10 replications with each being a leaf from one of 10 branches±SE.

As can be seen from FIG. 4A, dipping the whole branches for an hour in 6 mM Phe increased resistance of the plants to *botrytis* significantly.

Example 6

Treatment of Sweet Basil with Exogenous Phenylalanine Increases Tolerance to White Rot (*Sclerotinia sclerotiorum*)

Sweet basil plants in pots were treated with 4.1 mM Phe as described for tomato, and inoculated with a *S. sclerotiorum* mycelium disc from 4 days potato dextrose agar culture (White rot), related to *botrytis*, both being from the Ascomycota division. Treatment showed a significant reduction in disease symptoms as determined by decay area (described above). See FIGS. 5A-B. FIG. 5B shows a Sweet basil plant infected by *Sclerotinia sclerotiorum* causing white mold disease.

Example 7

Treatment of Tomato with Exogenous Phenylalanine Increases Tolerance to White Rot (*Sclerotinia sclerotiorum*)

In addition to increasing resistance to White rot disease in sweet basil as shown in the Example above, phenylalanine spray and drench treatments (identical to those described in Example 6 for sweet basil) also increase the resistance of tomato leaves to this fungus, related to *botrytis* (FIGS. 6A-B).
FIG. 6B shows tomato leaflet infected by *Sclerotinia sclerotiorum* causing white mold disease.

Example 8

Treatment of Lemon with Exogenous Phenylalanine Increases Tolerance to Mal Secco Disease, Caused by the *Plenodomus tracheiphilus* Syn *Phoma tracheiphila* Fungus Lemon plants in pots were treated with 4 mM Phe water solutions either by drenching 10 ml of solution per pot or spraying, as described for tomato. Infection was carried out by conidia suspension of *Plenodomus tracheiphilus* after leaf wounding by a needle. Both treatments increased the resistance of the plant leaves to the fungus, as shown in FIG. 7A. Disease incidence was evaluated according to the amount of successful infection sites on the infected leaves and presented as percent of infected leaves.
FIG. 7B shows a lemon Leaf showing typical mal secco disease caused by *Plenodomus tracheiphilus*.

Example 9

Treatment of Avocado Fruit, Postharvest, with Exogenous Phenylalanine Increases Tolerance to *Alternaria alternate*

Avocado fruits of the cultivar 'Ettinger' were dipped in water or 1 mM or 4 mM phenylalanine for 30 seconds and stored for one day at 5° C. Then the avocado fruit were inoculated at the fruit equatorial with *Alternaria alternata* at the concentration of $10^5$ conidia/ml at two sides of the fruit. The decay area was monitored during 6 days post inoculation, while incubation at 23° C. Significantly, dipping at phenylalanine at 1-4 mM reduced the area of brown spots caused by *Alternaria alternata* by four folds 6 days post inoculation (see FIG. 8).

Example 10

Treatment of Cucumber Plants with Exogenous Phenylalanine Increases Tolerance to *Pythium aphanidermatum*

Cucumber plantlets cv. Bet Alpha and grown in peat based growing medium were treated either by drenching 4 mM phenylalanine solution, 10 ml per pot containing 4 plants each. and the percent plantlets that survived was determined in each treatment. FIG. 9A shows the percentage of dead plants due to damping off disease (*Pythium aphanidermatum*) in Phe-treated and -untreated pots. FIG. 9B presents two pots of each treatment; Pots in the lower row were not treated and pots in upper row were treated with 4 mM Phe.

Example 11

Spraying Tomato and *Petunia* Plants with Tyrosine Results in Increased Resistance to *B. cinerea*, Similar to Phe Tomato plants (FIG. 10A) and *Petunia* plants (FIG. 10B) were infected with *Botrytis* as described above. Tyr, Phe at concentrations of 0.5 mM applied by spraying both alone and in combination reduced *B. cinerea* infection. Disease was evaluated as mentioned above. Similar results were obtained with 4 mM of Tyr or Phe applied by spraying both alone and in combination (Results not presented).

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

REFERENCES

1. Alon M, Malka O, Eakteiman G, Elbaz M, Moyal Ben Zvi M, Vainstein A, Morin S. 2013. Activation of the phenylpropanoid pathway in *Nicotiana tabacum* improves the performance of the whitefly *Bemisia tabaci* via reduced jasmonate signaling. PLoS ONE 8, e76619.
2. Aranega-Bou P, de la O Leyva M, Finiti I, García-Agustín P, González-Bosch C. 2014. Priming of plant resistance by natural compounds. Hexanoic acid as a model. Plant Physiology 5, 488.

3. Asselbergh B, Curvers K, Franca S C, Audenaert K, Vuylsteke M, Van Breusegem F, Höfte M. 2007. Resistance to *Botrytis cinerea* in sitiens, an abscisic acid-deficient tomato mutant, involves timely production of hydrogen peroxide and cell wall modifications in the epidermis. Plant Physiology 144, 1863-1877.

4. Bahadur A, Singh D P, Sarma B K, Singh U P. 2012. Foliar application of 1-phenylalanine and ferulic acids to pea plants: induced phenylalanine ammonia lyase activity and resistance against *Erysiphe pisi*. Archives of Phytopathology and Plant Protection 45, 398-403.

5. Bais H P, Walker T S, Schweizer H P, Vivanco J M. 2002. Root specific elicitation and antimicrobial activity of rosmarinic acid in hairy root cultures of *Ocimum basilicum*. Plant Physiology and Biochemistry 40, 983-995.

6. Camañes G, Scalschi L, Vicedo B, González-Bosch C, García-Agustín P. 2015. An untargeted global metabolomic analysis reveals the biochemical changes underlying basal resistance and priming in *Solanum lycopersicum*, and identifies 1-methyltryptophan as a metabolite involved in plant responses to *Botrytis cinerea* and *Pseudomonas syringae*. The Plant Journal: For Cell and Molecular Biology 84, 125-139.

7. Chen M, Cheng B, Zhang Q, Ding Y, Yang Z, Liu P. 2005. [Effects of applying L-methionine, L-phenylalanine and L-tryptophan on *Zea mays* growth and its nutrient uptake]. Ying Yong Sheng Tai Xue Bao=The Journal of Applied Ecology/Zhongguo Sheng Tai Xue Xue Hui, Zhongguo Ke Xue Yuan Shenyang Ying Yong Sheng Tai Yan Jiu Suo Zhu Ban 16, 1033-1037.

8. Chen Z, Zheng Z, Huang J, Lai Z, Fan B. 2009. Biosynthesis of salicylic acid in plants. Plant Signaling & Behavior 4, 493-496.

9. Choquer M, Fournier E, Kunz C, *Levis* C, Pradier J-M, Simon A, Viaud M. 2007. *Botrytis cinerea* virulence factors: new insights into a necrotrophic and polyphageous pathogen. FEMS Microbiology Letters 277, 1-10.

10. Dickman M B, Fluhr R. 2013. Centrality of host cell death in plant-microbe interactions. *Annual Review of Phytopathology*, 51, 543-570.

11. Elad Y. 1992. The use of antioxidants (free radical scavengers) to control grey mould (*Botrytis cinerea*) and white mould (*Sclerotinia sclerotiomm*) in various crops. Plant Pathology 41, 417-426.

12. Elad Y, Pertot I, Cotes Prado A M, Stewart A. 2016. Plant hosts of *Botrytis* spp. In: Fillinger S, In: Fillinger S and Elad Y, eds. *Botrytis—the Fungus, the Pathogen and its Management in Agricultural Systems*. Springer International Publishing, pp 413-486.

13. Fillinger S, Elad Y (eds). 2016. *Botrytis—the Fungus, the Pathogen and its Management in Agricultural Systems*. Springer.

14. Grey C B, Cowan D P, Langton S D, Watkins R W. 1997. Systemic Application of L-Phenylalanine Increases Plant Resistance to Vertebrate Herbivory. Journal of Chemical Ecology 23, 1463-1470.

15. Hirata H, Ohnishi T, Ishida H, Tomida K, Sakai M, Hara M, Watanabe N. 2012. Functional characterization of aromatic amino acid aminotransferase involved in 2-phenylethanol biosynthesis in isolated rose petal protoplasts. Journal of Plant Physiology 169, 444-451.

16. Kuc J. 1995. Phytoalexins, Stress Metabolism, and Disease Resistance in Plants. Annual Review of Phytopathology 33, 275-297.

17. Lattanzio V, Lattanzio V M, Cardinali A. 2006. Role of phenolics in the resistance mechanisms of plants against fungal pathogens and insects. Phytochemistry: Advances in research 661, 23-67.

18. Maeda H, Dudareva N. 2012. The shikimate pathway and aromatic amino Acid biosynthesis in plants. Annual Review of Plant Biology 63, 73-105.

19. Manela N, Oliva M, Ovadia R, Sikron-Persi N, Ayenew B, Fait A, Galili G, Perl A, Weiss D, Oren-Shamir M. 2015. Phenylalanine and tyrosine levels are rate-limiting factors in production of health promoting metabolites in *Vitis vinifera* cv. Gamay Red cell suspension. Frontiers in Plant Science 6.

20. Nakabayashi R, Yonekura-Sakakibara K, Urano K, et al. 2014. Enhancement of oxidative and drought tolerance in *Arabidopsis* by overaccumulation of antioxidant flavonoids. The Plant Journal 77, 367-379.

21. Nakajima M, Akutsu K. 2014. Virulence factors of *Botrytis cinerea*. Journal of General Plant Pathology 80, 15-23.

22. Oliva M, Ovadia R, Perl A, Bar E, Lewinsohn E, Galili G, Oren-Shamir M. 2015a. Enhanced formation of aromatic amino acids increases fragrance without affecting flower longevity or pigmentation in *Petunia×hybrida*. Plant Biotechnology Journal 13, 125-136.

23. Oliva M, Ovadia R, Perl A, Bar E, Lewinsohn E, Galili G, Oren-Shamir M. 2015b. Enhanced formation of aromatic amino acids increases fragrance without affecting flower longevity or pigmentation in *Petunia×hybrida*. Plant Biotechnology Journal 13, 125-136.

24. Pandey P, Ramegowda V, Senthil-Kumar M. 2015. Shared and unique responses of plants to multiple individual stresses and stress combinations: physiological and molecular mechanisms. Plant Physiology, 723.

25. Patel T K, Krasnyanski S F, Allen G C, Louws F J, Panthee D R, Williamson J D. 2015. Tomato Plants Overexpressing a Celery Mannitol Dehydrogenase (MTD) Have Decreased Susceptibility to <i>Botrytis cinerea</i> American Journal of Plant Sciences 06, 1116-1125.

26. Pennycooke J C, Cox S, Stushnoff C. 2005. Relationship of cold acclimation, total phenolic content and antioxidant capacity with chilling tolerance in petunia (*Petunia× hybrida*). Environmental and Experimental Botany 53, 225-232.

27. Petersen M, Abdullah Y, Benner J, et al. 2009. Evolution of rosmarinic acid biosynthesis. Phytochemistry 70, 1663-1679.

28. Scalschi L, Sanmartin M, Camañes G, Troncho P, Sánchez-Serrano J J, García-Agustín P, Vicedo B. 2015. Silencing of OPR3 in tomato reveals the role of OPDA in callose deposition during the activation of defense responses against *Botrytis cinerea*. *The Plant Journal: For Cell and Molecular Biology* 81, 304-315.

29. Shekarchi M, Hajimehdipoor H, Saeidnia S, Gohari A R, Hamedani M P. 2012. Comparative study of rosmarinic acid content in some plants of Labiatae family. Pharmacognosy Magazine 8, 37-41.

30. Siegmund U, Viefhues A. 2016. Reactive Oxygen Species in the *Botrytis*—Host Interaction. In: Fillinger S, In: Elad Y, eds. *Botrytis*—the Fungus, the Pathogen and its Management in Agricultural Systems. Springer International Publishing, 269-289.

31. Song G C, Choi H K, Ryu C-M. 2013. The folate precursor para-aminobenzoic acid elicits induced resistance against Cucumber mosaic virus and *Xanthomonas axonopodis*. Annals of Botany, mct049.

32. Szarka A, Tomasskovics B, Bánhegyi G. 2012. The Ascorbate-glutathione-α-tocopherol Triad in Abiotic Stress Response. International Journal of Molecular Sciences 13, 4458-4483.
33. Tohge T, Watanabe M, Hoefgen R, Fernie A R. 2013. Shikimate and Phenylalanine Biosynthesis in the Green Lineage. Frontiers in Plant Science 4.
34. Tzin V, Galili G. 2010. The Biosynthetic Pathways for Shikimate and Aromatic Amino Acids in *Arabidopsis thaliana*. The *Arabidopsis* Book/American Society of Plant Biologists 8, e0132.
35. Tzin V, Malitsky S, Ben Zvi M M, Bedair M, Sumner L, Aharoni A, Galili G. 2012a. Expression of a bacterial feedback-insensitive 3-deoxy-D-arabino-heptulosonate 7-phosphate synthase of the shikimate pathway in *Arabidopsis* elucidates potential metabolic bottlenecks between primary and secondary metabolism. The New Phytologist 194, 430-439.
36. Tzin V, Rogachev I, Meir S, Zvi M M B, Masci T, Vainstein A, Aharoni A, Galili G. 2013. Tomato fruits expressing a bacterial feedback-insensitive 3-deoxy-d-arabino-heptulosonate 7-phosphate synthase of the shikimate pathway possess enhanced levels of multiple specialized metabolites and upgraded aroma. Journal of experimental botany 64, 4441-4452.
37. Vogt T. 2010. Phenylpropanoid Biosynthesis. Molecular Plant 3, 2-20.
38. Wang H, Liu G, Li C, Powell A L T, Reid M S, Zhang Z, Jiang C-Z. 2013. Defence responses regulated by jasmonate and delayed senescence caused by ethylene receptor mutation contribute to the tolerance of *petunia* to *Botrytis cinerea*. Molecular Plant Pathology 14, 453-469.
39. Zhang Y, De Stefano R, Robine M, Butelli E, Bulling K, Hill L, Rejzek M, Martin C, Schoonbeek H-J. 2015. Different Reactive Oxygen Species Scavenging Properties of Flavonoids Determine Their Abilities to Extend the Shelf Life of Tomato. Plant Physiology 169, 1568-1583.

What is claimed is:

1. A method of treating a fungus infection in a fruit, a leaf, a seed, or a flower of a plant, the method comprising:
   a. selecting a plant infected with a fungus being selected from the group consisting of *Botrytis, Plenodomus tracheiphilus* syn *Phoma tracheiphila, Sclerotinia sclerotiorum, Pythium aphanidermatum* and *Alternaria*; and
   b. applying to said plant infected with said fungus a composition comprising a carrier and active agent, wherein said active agent consists of 2-30 mM of phenylalanine for treating said fungus infection in the fruit, the leaf, the seed, or the flower of said plant.

2. The method of claim 1, wherein said applying comprises pre-harvest applying.

3. The method of claim 1, wherein said applying comprises post-harvest applying.

4. The method of claim 1, wherein said plant is at a post-blossom stage, at a blossom stage, or at a pre-blossom stage.

5. The method of claim 1, wherein said phenylalanine is formulated in a composition selected from the group consisting of a dip, a spray or a concentrate.

6. The method of claim 1, wherein said applying is by irrigation, drenching, dipping, soaking, injection, coating or spraying.

7. The method of claim 1, wherein said plant is selected from the group consisting of *petunia*, tomato, sweet basil, cucumber, avocado, strawberry, grape, apple, blueberry, cherry, bean, cabbage, carrot, onion and lemon.

8. The method of claim 1, wherein said applying is in a storage facility.

9. The method of claim 1, wherein said applying comprises repeated application.

10. The method of claim 1, wherein said applying comprises weekly administration during blossom pre-harvest.

11. The method of claim 1, wherein said applying is by spraying.

* * * * *